(12) United States Patent
Vyas et al.

(10) Patent No.: US 12,713,319 B2
(45) Date of Patent: Aug. 18, 2026

(54) TECHNIQUES FOR CELL BAR TIME SELECTION

(71) Applicant: QUALCOMM INCORPORATED, San Diego, CA (US)

(72) Inventors: Uttam Vyas, Hyderabad (IN); Balaji Kannan, Hyderabad (IN); Muralidharan Murugan, Hyderabad (IN); Nitin Pant, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 616 days.

(21) Appl. No.: 18/003,912

(22) PCT Filed: Apr. 27, 2021

(86) PCT No.: PCT/US2021/029460

§ 371 (c)(1),
(2) Date: Dec. 29, 2022

(87) PCT Pub. No.: WO2022/050990

PCT Pub. Date: Mar. 10, 2022

(65) Prior Publication Data

US 2023/0224789 A1 Jul. 13, 2023

(30) Foreign Application Priority Data

Sep. 3, 2020 (IN) ............................ 202041038125

(51) Int. Cl.

| | |
|---|---|
| ***H04W 36/30*** | (2009.01) |
| ***H04W 36/00*** | (2009.01) |
| ***H04W 36/08*** | (2009.01) |

(52) U.S. Cl.

CPC ... *H04W 36/305* (2018.08); *H04W 36/00835* (2018.08); *H04W 36/08* (2013.01)

(58) Field of Classification Search

CPC ............... H04W 36/305; H04W 48/16; H04W 36/00835; H04W 36/08;

(Continued)

(56) References Cited

U.S. PATENT DOCUMENTS

2015/0296444 A1 10/2015 Sfar
2018/0007580 A1 * 1/2018 Kang ................ H04W 28/0263

(Continued)

FOREIGN PATENT DOCUMENTS

| | | | | |
|---|---|---|---|---|
| CN | 106664639 A | 5/2017 | | |
| EP | 2603045 A1 * | 6/2013 | ............ | H04W 48/20 |
| WO | WO-2017030713 | 2/2017 | | |

OTHER PUBLICATIONS

International Search Report and Written Opinion—PCT/US2021/029460—ISA/EPO—Jul. 23, 2021.

(Continued)

*Primary Examiner* — Ji-Hae Yea
(74) *Attorney, Agent, or Firm* — Holland & Hart LLP

(57) ABSTRACT

Methods, systems, and devices for are described. A user equipment (UE) may be configured to initiate a first setup procedure with a first cell supported by a base station. The UE may determine a system information block (SIB) read failure, a radio link failure, or both, based on initiating the first setup procedure. The UE may determine whether a link quality metric associated with communications between the UE and the first cell satisfies a link quality threshold. The UE may select a cell bar time based on a type of a communications service established via the base station, whether the link quality metric satisfies the link quality threshold, or both. The UE may then initiate a cell reselection procedure based on the cell bar time.

28 Claims, 10 Drawing Sheets

(58) Field of Classification Search
CPC . H04W 36/008355; H04W 36/008357; H04W 36/00838; H04W 36/083; H04W 36/085; H04W 36/087; H04W 36/13
See application file for complete search history.

(56) References Cited

U.S. PATENT DOCUMENTS

| | | | | |
|---|---|---|---|---|
| 2018/0027479 | A1* | 1/2018 | Ahmad | H04W 48/12 370/235 |
| 2018/0332521 | A1* | 11/2018 | Subramanian | H04W 24/02 |
| 2019/0349849 | A1* | 11/2019 | Kavuri | H04W 8/18 |

OTHER PUBLICATIONS

Qualcomm Incorporated: "Cell Barring and Reservations for NR", 3GPP TSG-RAN2 Meeting #99bis, 3GPP Draft, R2-1710805 NR Cell Reservation, 3rd Generation Partnership Project (3GPP), Mobile Competence Centre, 650, Route Des Lucioles, F-06921 Sophia-Antipolis Cedex, France, vol. RAN WG2, No. Prague, Czech Republic, Oct. 9, 2017-Oct. 13, 2017, Sep. 29, 2017 (Sep. 29, 2017), 3 Pages, XP051355202, The whole document.

* cited by examiner

400

600

TECHNIQUES FOR CELL BAR TIME SELECTION

CROSS REFERENCE

The present Application is a 371 national stage filing of International PCT Application No. PCT/US2021/029460 by Vyas et al. entitled "TECHNIQUES FOR CELL BAR TIME SELECTION," filed Apr. 27, 2021; and claims priority to Indian Patent Application No. 202041038125 by Vyas et al. entitled "TECHNIQUES FOR CELL BAR TIME SELECTION," filed Sep. 3, 2020, each of which is assigned to the assignee hereof, and each of which is expressly incorporated by reference in its entirety herein.

FIELD OF TECHNOLOGY

The following relates to wireless communications, including techniques for cell bar time selection.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a UE may "bar" a cell from a list of available cells in poor signal conditions in order to prevent the UE from continually attaching to a problematic cell. For example, a UE may bar a problematic cell for a pre-defined duration (e.g., 30 seconds, 300 seconds) to prevent the UE from attempting to attach to the problematic cell and enable the UE to scan for and attach to other cells. However, communication disruptions may occur in cases where the UE bars the problematic cell for the pre-defined duration but is unable to attach to a new cell.

SUMMARY

The described techniques relate to improved methods, systems, devices, and apparatuses that support techniques for cell bar time selection. In some aspects, a user equipment (UE) may be configured with multiple cell bar times, and may be configured to select shorter cell bar times when certain conditions are met. Conditions which the UE may consider when selecting a cell bar time may include whether an ongoing communications service includes a performance-critical communications service (e.g., voice over Long-Term Evolution (VoLTE) call, voice over New Radio (VoNR) call, gaming service), whether link quality thresholds associated with the serving cell satisfy one or more link quality thresholds, or both. For example, a UE may establish a communications service in a connected mode of operation with a first cell supported by a base station. In some cases, the first cell may be associated with a default cell bar time. The UE may determine a system information block (SIB) read failure, a radio link failure (RLF), or both, associated with the first cell. The UE may additionally determine one or more parameters associated with the communications service being performed at the UE, one or more link quality parameters (e.g., reference signal received power (RSRP), reference signal received quality (RSRQ), signal-to-noise ratio (SNR), signal-to-interference-plus-noise ratio (SINR)) associated with the first cell, or both. In this example, the UE may select a cell bar time (e.g., a cell bar time which is shorter than a default cell bar time) if the one or more parameters indicate that the communications service includes a performance-critical communications service and/or if the one or more link quality parameters indicate that the link quality of the cell is less than (e.g., worse than) a threshold link quality (e.g., $RSRP_{Cell} \leq Thresh_{RSRP}$). By utilizing a shorter cell bar time, techniques described herein may enable the UE to scan for new cells and enable the UE to re-attempt communications with the barred cell after a shorter duration under certain conditions, which may reduce the time the UE is out of service and prevent failure of performance-critical communications services.

A method for wireless communication at a UE is described. The method may include initiating a first setup procedure with a first cell supported by a base station, determining a SIB read failure, an RLF, or both, based on initiating the first setup procedure, identifying a type of a communications service established via the base station, determining whether a link quality metric associated with communications between the UE and the first cell satisfies a link quality threshold, selecting a cell bar time based on the type of the communications service, whether the link quality metric satisfies the link quality threshold, or both, and initiating a cell reselection procedure based on the cell bar time.

An apparatus for wireless communication at a UE is described. The apparatus may include a processor, memory in electronic communication with the processor, and instructions stored in the memory. The instructions may be executable by the processor to cause the apparatus to initiate a first setup procedure with a first cell supported by a base station, determine a SIB read failure, an RLF, or both, based on initiating the first setup procedure, identify a type of a communications service established via the base station, determine whether a link quality metric associated with communications between the UE and the first cell satisfies a link quality threshold, select a cell bar time based on the type of the communications service, whether the link quality metric satisfies the link quality threshold, or both, and initiate a cell reselection procedure based on the cell bar time.

Another apparatus for wireless communication at a UE is described. The apparatus may include means for initiating a first setup procedure with a first cell supported by a base station, means for determining a SIB read failure, an RLF, or both, based on initiating the first setup procedure, means for identifying a type of a communications service established via the base station, means for determining whether a link quality metric associated with communications between the UE and the first cell satisfies a link quality threshold, means for selecting a cell bar time based on the type of the communications service, whether the link quality metric satisfies the link quality threshold, or both, and means for initiating a cell reselection procedure based on the cell bar time.

A non-transitory computer-readable medium storing code for wireless communication at a UE is described. The code may include instructions executable by a processor to initiate a first setup procedure with a first cell supported by a base station, determine a SIB read failure, an RLF, or both, based on initiating the first setup procedure, identify a type of a communications service established via the base station, determine whether a link quality metric associated with communications between the UE and the first cell satisfies a link quality threshold, select a cell bar time based on the type of the communications service, whether the link quality metric satisfies the link quality threshold, or both, and initiate a cell reselection procedure based on the cell bar time.

In some examples of the method, apparatuses, and non-transitory computer-readable medium described herein, initiating the cell reselection procedure based on the cell bar time may include operations, features, means, or instructions for adding the first cell to a list of barred cells based on selecting the cell bar time and scanning for cells different from the first cell based on adding the first cell to the list of barred cells.

Some examples of the method, apparatuses, and non-transitory computer-readable medium described herein may further include operations, features, means, or instructions for determining an expiration of the cell bar time, removing the first cell from the list of barred cells based on determining the expiration of the cell bar time, and initiating a second setup procedure with the first cell based on removing the first cell from the list of barred cells.

Some examples of the method, apparatuses, and non-transitory computer-readable medium described herein may further include operations, features, means, or instructions for determining whether the type of the communications service may be one of a set of predefined performance-critical communications services.

Some examples of the method, apparatuses, and non-transitory computer-readable medium described herein may further include operations, features, means, or instructions for selecting the cell bar time may be based on determining that the type of the communications service may be one of the set of predefined performance-critical communications services.

In some examples of the method, apparatuses, and non-transitory computer-readable medium described herein, the predefined set of communications services includes a VoLTE call, a VoNR call, a gaming communications service, or any combination thereof.

Some examples of the method, apparatuses, and non-transitory computer-readable medium described herein may further include operations, features, means, or instructions for selecting a second cell bar time different from the cell bar time if the link quality metric fails to satisfy the link quality threshold and selecting the cell bar time if the link quality metric satisfies the link quality threshold.

In some examples of the method, apparatuses, and non-transitory computer-readable medium described herein, the cell bar time may be shorter than the second cell bar time.

Some examples of the method, apparatuses, and non-transitory computer-readable medium described herein may further include operations, features, means, or instructions for determining a set of cell bar times, determining that the link quality metric satisfies the link quality threshold, determining that the link quality metric fails to satisfy a second link quality threshold different from the link quality threshold, and selecting the cell bar time from the set of cell bar times based on determining the link quality metric satisfies the link quality threshold and fails to satisfy the second link quality threshold.

Some examples of the method, apparatuses, and non-transitory computer-readable medium described herein may further include operations, features, means, or instructions for determining an RSRP metric associated with the first cell, an RSRQ metric associated with the first cell, an SNR metric associated with the first cell, an SINR metric associated with the first cell, or any combination thereof, where the link quality metric includes the RSRP metric, the RSRQ metric, the SNR metric, the SINR metric, or any combination thereof.

Some examples of the method, apparatuses, and non-transitory computer-readable medium described herein may further include operations, features, means, or instructions for determining a type of bearer associated with the communications service, a latency metric associated with the communications service, a quality of service (QoS) metric associated with the communications service, a reliability metric associated with the communications service, or any combination thereof, where determining the type of the communications service may be based on the determined type of bearer, the determined latency metric, the determined QoS metric, the determined reliability metric, or any combination thereof.

Some examples of the method, apparatuses, and non-transitory computer-readable medium described herein may further include operations, features, means, or instructions for receiving, from a higher layer of the UE, an indication of the type of the communications service, where determining the type of the communications service may be based on receiving the indication from the higher layer of the UE.

Some examples of the method, apparatuses, and non-transitory computer-readable medium described herein may further include operations, features, means, or instructions for establishing the communications service in a connected mode of operation prior to initiating the first setup procedure, where determining the SIB read failure, the RLF, or both, may be based on establishing the communications service in the connected mode of operation.

DETAILED DESCRIPTION

Figure 1:
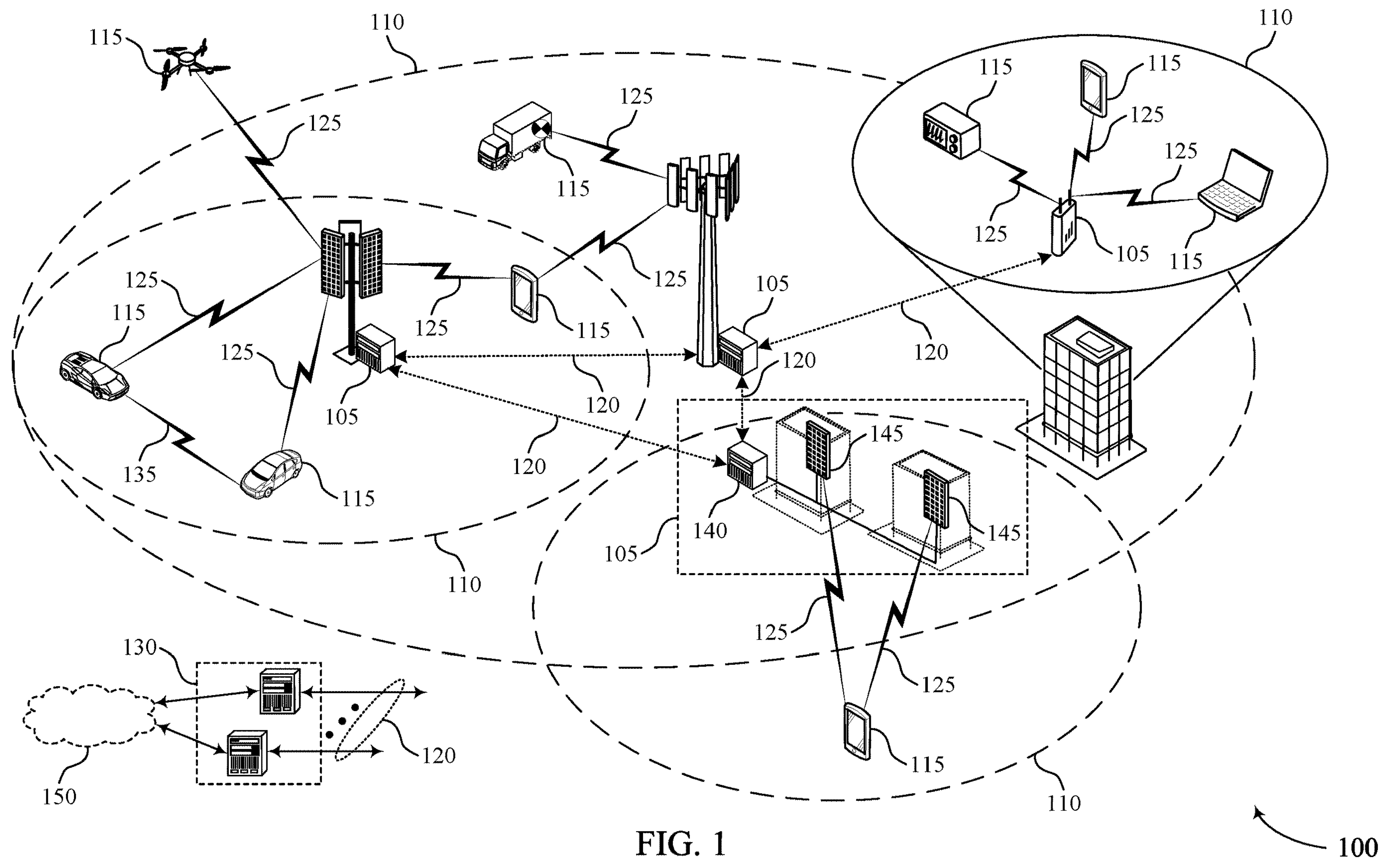
FIG. 1 illustrates an example of a wireless communications system that supports techniques for cell bar time selection in accordance with aspects of the present disclosure.

In some wireless communications systems, a user equipment (UE) may "bar" a cell from a list of available cells in poor signal conditions in order to prevent the UE from continually attaching to a problematic cell. For example, in cases where a UE experiences mandatory system information block (SIB) read failures, radio link failures (RLFs), or both, the UE may bar the cell (e.g., add the cell to a list of blocked/barred cells) for a pre-defined duration to prevent the UE from attempting to attach to the problematic cell for the pre-defined duration, and enable the UE to scan for and attach to other cells during the pre-defined duration. In some wireless communications, the UE and/or cells may be associated with a pre-defined, static cell bar time. For example, the cell bar time may be 30 seconds, 300 seconds, or another duration. However, in cases where the UE bars the problematic cell for the pre-defined duration (e.g., 30 seconds, 300 seconds) but is unable to attach to a new cell during the pre-defined duration, the UE may lose service and may drop or cause failure of ongoing performance-critical communications operations, such as voice over LTE (VoLTE) calls, voice over New Radio (VoNR) calls, gaming operations, or any combination thereof. For example, if the UE bars the serving cell for 30 seconds while the UE is carrying out a VoNR call, but is unable to find a new cell, the VoNR call may be dropped. Accordingly, cell bar times used in some wireless communications systems may lead to loss of service, failures of performance-critical operations, and overall impairment in consumer experience and satisfaction.

To improve wireless communications in the context of cell selection, techniques for cell bar time selection are disclosed. In particular, a UE may be configured with multiple cell bar times, and may be configured to select shorter cell bar times when certain conditions are met. Conditions which the UE may consider when selecting a cell bar time may include whether an ongoing communications service includes a performance-critical communications service (e.g., VoLTE call, VoNR call, gaming service), whether link quality thresholds associated with the serving cell satisfy link quality threshold(s), or both.

For example, a UE may establish a communications service in a connected mode of operation with a cell supported by a base station. In some cases, the first cell may be associated with a default cell bar time. The UE may determine a SIB read failure, an RLF, or both, associated with the first cell. Additionally, the UE may determine a set of parameters associated with the communications service being performed at the UE, a set of link quality parameters (e.g., reference signal received power (RSRP), reference signal received quality (RSRQ), received signal strength indicator (RSSI), signal-to-noise ratio (SNR), signal-to-interference-plus-noise ratio (SINR)) with the first cell, or both. In this example, the UE may select a cell bar time (e.g., a cell bar time which is shorter than a default cell bar time) if the set of parameters indicate that the communications service includes a performance-critical communications service and/or if the set of link quality parameters indicate that the link quality of the cell is less than (e.g., worse than) a threshold link quality (e.g., $RSRP_{Cell} \leq Thresh_{RSRP}$). By utilizing a shorter cell bar time, techniques described herein may enable the UE to scan for new cells and enable the UE to re-attempt communications with the barred cell after a shorter duration in certain scenarios, which may reduce the time the UE is out of service and prevent failure of performance-critical communications services.

Aspects of the disclosure are initially described in the context of wireless communications systems. Additional aspects of the disclosure are described in the context of an example process flow. Aspects of the disclosure are further illustrated by and described with reference to apparatus diagrams, system diagrams, and flowcharts that relate to techniques for cell bar time selection.

FIG. 1 illustrates an example of a wireless communications system 100 that supports techniques for cell bar time selection in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max}\cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area

110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE- Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARD) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some aspects, the UEs 115 and the base stations 105 of the wireless communications system 100 may support techniques for cell bar time selection. In particular, a UE 115 of the wireless communications system 100 may be configured with multiple cell bar times, and may be configured to select shorter cell bar times when certain conditions are met. Conditions which the UE 115 may consider when selecting a cell bar time may include whether an ongoing communications service includes a performance-critical communications service (e.g., VoLTE call, VoNR call, gaming service), whether link quality thresholds associated with the serving cell satisfy link quality threshold(s), or both. By adaptively selecting cell bar times (e.g., shorter cell bar times), techniques described herein may enable UEs 115 of the wireless communications system to re-establish wireless communications with cells supported by base stations 105 of the wireless communications system 100 after a shorter duration and reduce the time the UE 115 is out of service, which may thereby prevent failures of performance-critical communications services.

For example, a UE 115 of the wireless communications system 100 may establish a communications service in a connected mode of operation with a cell supported by a base station 105 of the wireless communications system 100. In some cases, the first cell may be associated with a default cell bar time. In this example, the UE 115 may determine a SIB read failure, an RLF, or both, associated with the first cell. Additionally, the UE 115 may determine one or more parameters associated with the communications service being performed at the UE 115 (e.g., whether or not the communications service includes a performance-critical communications service such as VoLTE or VoNR), one or more link quality parameters (e.g., RSRP, RSRQ, RSSI, SNR, or SINR) with the first cell, or both. In this example, the UE 115 may select a cell bar time (e.g., a cell bar time which is shorter than a default cell bar time) if the one or more parameters indicate that the communications service includes a performance-critical communications service and/or if the one or more link quality parameters indicate that the link quality of the cell is less than (e.g., worse than) a threshold link quality (e.g., $RSRP_{Cell} \leq Thresh_{RSRP}$).

The techniques described herein may provide for improved wireless communications by reducing durations in which a UE 115 is out of service. In particular, by selecting shorter cell bar times, techniques described herein may enable the UE 115 to scan for new cells and enable the UE 115 to re-attempt communications with the barred cell after a shorter duration in certain scenarios, which may reduce the time the UE 115 is out of service and prevent failure of performance-critical communications services. By reducing a time the UE 115 is out of service, techniques described herein may reduce power consumption at the UE 115, restore service in a more timely manner, and improve user experience.

Figure 2:
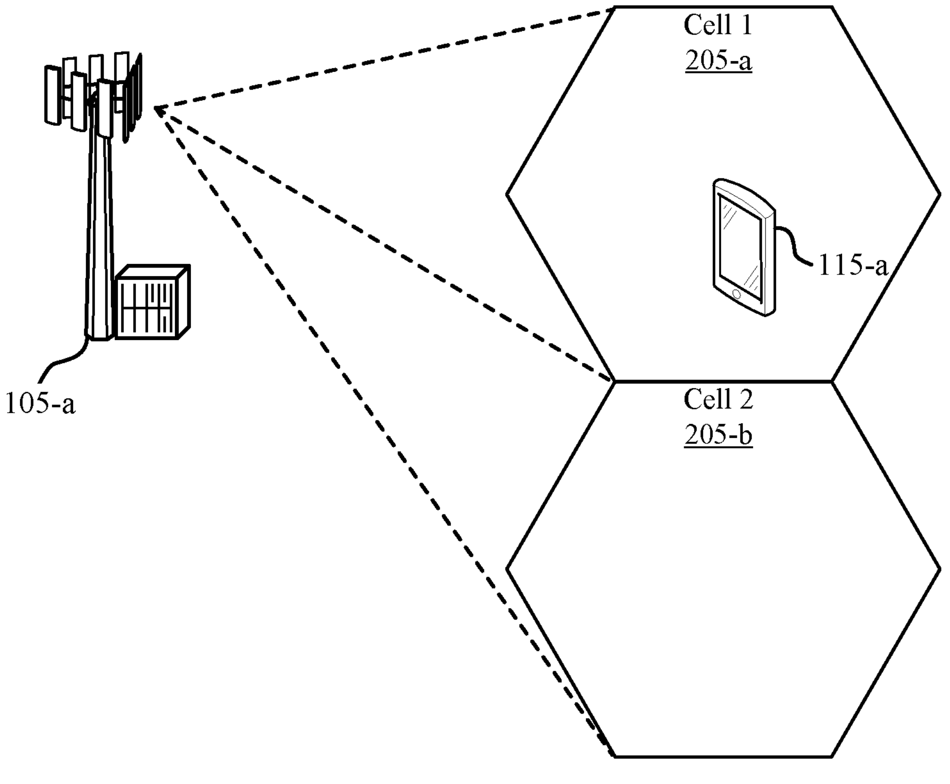
FIG. 2 illustrates an example of a wireless communications system that supports techniques for cell bar time selection in accordance with aspects of the present disclosure.

FIG. 2 illustrates an example of a wireless communications system 200 that supports techniques for cell bar time selection in accordance with aspects of the present disclosure. In some examples, wireless communications system 200 may implement aspects of wireless communications system 100. The wireless communications system 200 may include a UE 115-*a* and a base station 105-*a*, which may be examples of UEs 115 and base stations 105, as described with reference to FIG. 1.

The wireless communications system 200 may support wireless communications with wireless devices (e.g., UE 115-*a*) via one or more cells 205 of the wireless communications system 200. In particular, each cell 205 may be supported by one or more base stations 105 of the wireless communications system 200. For example, as shown in FIG. 2, the wireless communications system 200 may include a first cell 205-*a* supported by the base station 105-*a*, and a second cell 205-*b* supported by the base station 105-*a*. The wireless communications system 200 may include any quantity of cells 205 supported by any quantity of base stations 105. For example, in additional or alternative cases, the first cell 205-*a* may be supported by the base station 105-*a*, and the second cell 205-*b* may be supported by a second base station 105 (not shown) which is different from the base station 105-*a*.

In some aspects, the UE 115-*a* may communicate with the base station 105-*a* using one or more beams, one or more communications links, or both. For example, each cell 205 may be associated with a different frequency range, separate beams, and/or separate communications links to facilitate wireless communications between the UE 115-*a* and the respective cells 205. In some cases, the communication links may include an example of an access link (e.g., a Uu link). The communication links may include bi-directional links that can include both uplink and downlink communication. For example, the UE 115-*a* may transmit uplink transmissions, such as uplink control signals or uplink data signals, to the base station 105-*a* using a communication link, and the base station 105-*a* may transmit downlink transmissions, such as downlink control signals or downlink data signals, to the UE 115-*a* using the communication link.

In some aspects, the UE 115-*a* and the base station 105-*a* of the wireless communications system 200 may support techniques for cell bar time selection. In particular, the UE 115-*a* of the wireless communications system 200 may be configured with multiple cell bar times, and may be configured to select shorter cell bar times when certain conditions are met. Conditions which the UE 115-*a* may consider when selecting a cell bar time may include whether an ongoing communications service includes a performance-critical communications service (e.g., VoLTE call, VoNR call, gaming service), whether link quality thresholds associated with the serving cell satisfy link quality threshold(s), or both. By adaptively selecting cell bar times (e.g., shorter cell bar times), techniques described herein may enable the UE 115-*a* of the wireless communications system to re-establish wireless communications with cells 205 supported by base stations 105 of the wireless communications system 200 after a shorter duration and reduce the time the UE 115-*a* is out of service, which may thereby prevent failures of performance-critical communications services.

For example, in some cases, the UE 115-*a* may establish a communications service while operating in a connected mode of operation. In some aspects, the UE 115-*a* may establish the communications service with the first cell 205-*a* supported by the base station 105-*a*. The communications service may include any communications service known in the art including, but not limited to, a VoLTE call, a VoNR call, a gaming communications service, a web browsing communications service, or any combination thereof. In some aspects, the UE 115-*a* may initiate, or otherwise perform, a first setup procedure with the first cell 205-*a* supported by a base station 105-*a*. For example, the first UE 115-*a* may initiate an attachment procedure with the first cell 205-*a*. In some aspects, the UE 115-*a* may initiate the first setup procedure after establishing the communications service.

In some aspects, the first cell 205-*a* may be associated with, or the UE 115-*a* may be configured with, a default cell bar time. The default cell bar time may define a time duration in which UEs 115 are to add the first cell 205-*a* to a list of barred cells (and/or remove the first cell 205-*a* from a list of available cells 205) in the event that a failure associated with the first cell 205-*a* is identified, or if the first cell 205-*a* is otherwise found to be problematic. In some cases, the default cell bar time may include 30 seconds, 300 seconds, or another duration.

In some cases, the UE 115-*a* may determine a SIB read failure, an RLF, or both, associated with the first cell 205-*a*. In some aspects, the UE 115-*a* may determine the SIB read failure and/or the RLF based on establishing the communications service in the connected mode of operation, performing (e.g., initiating) the first setup procedure with the first cell 205-*a*, or both. For example, the UE 115-*a* may determine (e.g., observe) a read failure of a mandatory SIB while a timer (e.g., timer T311) is running. That is, the UE 115-*a* may start a timer (e.g., timer T311) during a setup or connection reestablishment procedure, and a read failure of a mandatory SIB or RLF may occur prior to completion of the setup or reestablishment procedure. By way of another example, the UE 115-*a* may identify poor wireless communications conditions which results in repeated RLFs while operating in the connected mode of operation.

In some aspects, the UE 115-*a* may identify/determine a type of a communications service which was established. In particular, the UE 115-*a* may determine the type of the communication service based on determining the SIB read failure, the RLF, or both, associated with the first cell 205-*a*. In some cases, the UE 115-*a* may determine whether the type of the communications service is one of a set of predefined performance-critical communications services. The set of predefined performance-critical communications services may include, but is not limited to, VoLTE calls, VoNR calls, gaming communications services, or any combination thereof. In this regard, the UE 115-*a* may determine whether the communications service includes a VoLTE call, a VoNR call, a gaming communications service, or any combination thereof.

In some aspects, the UE 115-*a* may determine the type of the communications service based on one or more parameters or characteristics associated with the communications service. Parameters or characteristics associated with the communications service which may be used to determine the type of the communications service may include, but are not limited to, a type of bearer(s) associated with the communications service, attributes associated with bearer(s) associated with the communications service, the quantity of bearer(s) associated with the communications service, a latency metric associated with the communications service, a quality of service (QoS) metric associated with the communications service, a reliability metric associated with the communications service, or any combination thereof.

For example, the bearers and/or type of bearers associated with the communications service may indicate that the communications service includes a performance-critical communications service. By way of another example, lower latency metrics, higher QoS metrics, and/or higher reliability metrics may be indicative of a performance-critical communications service, as compared to higher latency metrics, lower QoS metrics, and/or lower reliability metrics.

In additional or alternative aspects, the UE 115-*a* may determine the type of the communications service based on signaling from a higher layer of the UE 115-*a*. For example, a component (e.g., modem, processor) of the UE 115-*a* may receive, from a higher layer of the UE 115-*a* (e.g., MAC layer, application layer), an indication of the type of the communications service. In this regard, higher-layer signaling may indicate whether or not the communications service includes a performance-critical communications service. Similarly, the UE 115-*a* may determine the type of communications service based on signaling from an application or program executable by the UE 115-*a*. For example, the UE 115-*a* may establish a gaming communications service by executing a gaming application ("app") of the UE 115-*a*. In this example, the gaming application may indicate, to a component of the UE 115-*a* (e.g., modem, processor), that the gaming communications service includes a performance-critical communications service.

In some aspects, the UE 115-*a* may determine one or more link quality metrics associated with communications between the UE 115-*a* and the first cell 205-*a*. For example, the UE 115-*a* may perform a set of measurements on signals received from the first cell 205-*a* (e.g., signals received from the base station 105-*a* supporting the first cell 205-*a*), and may determine the one or more link quality metrics based on the set of measurements. The link quality metrics may include, but are not limited to, an RSRP metric, an RSRQ metric, an SNR metric, an SINR metric, or any combination thereof. In some aspects, the UE 115-*a* may determine the one or more link quality metrics based on establishing the communications service, initiating/performing the first setup procedure with the first cell 205-*a*, determining the SIB read failure and/or RLF associated with the first cell 205-*a*, determining the type of communications service, or any combination thereof.

Upon determining the one or more link quality metrics associated with communications between the UE 115-*a* and the first cell 205-*a*, the UE 115-*a* may determine whether the one or more link quality metrics satisfy one or more link quality thresholds. The one or more link quality thresholds may include, but are not limited to, RSRP thresholds, RSRQ thresholds, SNR thresholds, SINR thresholds, frequency tracking loop (FTL) error thresholds, time tracking loop (TTL) error thresholds, or any combination thereof. In some cases, the one or more link quality thresholds may be indicated to the UE 115-*a* via control signaling (e.g., RRC signaling) from the base station 105-*a*. Additionally or alternatively, the UE 115-*a* may be pre-configured with the link quality thresholds, may selectively adjust determined link quality thresholds based on network conditions, or both.

In some aspects, the UE 115-*a* may perform the comparison between the link quality metrics and the link quality thresholds based on establishing the communications service, initiating/performing the first setup procedure with the first cell 205-*a*, determining the SIB read failure and/or RLF associated with the first cell 205-*a*, determining the type of communications service, or any combination thereof.

In some aspects, the UE 115-*a* may determine that a respective link quality metric "satisfies" a respective link quality threshold if the link quality metric indicates a link quality associated with the first cell 205-*a* is less than (e.g., worse than) the respective link quality threshold. For example, in the case of RSRP, RSRQ, SNR, or SINR metrics, the UE 115-*a* may determine that the metrics satisfy a respective threshold if the metrics are less than or equal to the respective threshold (e.g., link quality thresholds satisfied if $RSRP_{Cell} \leq Thresh_{RSRP}$, $RSRQ_{Cell} \leq Thresh_{RSRQ}$, $SNR_{Cell} \leq Thresh_{SNR}$ or $SINR_{Cell} \leq Thresh_{SINR}$). Alternatively, the UE 115-*b* may determine that a respective link quality metric "satisfies" a respective link quality threshold if the link quality metric indicates a link quality associated with the first cell 205-*c* is greater than, or greater than or equal to, the respective link quality threshold. For example, in the case of error metrics, the UE 115-*b* may determine that the error metrics satisfy a respective threshold if they are greater than or equal to the respective threshold (e.g., error thresholds satisfied if $Error_{FTL} \geq Thresh_{FTL}$, or $Error_{TTL}$ $Thresh_{TTL}$).

In some aspects, the UE 115-*a* may select a cell bar time. In particular, the UE 115-*a* may select the cell bar time based on the type of communications service determined (e.g., whether the communications service includes a performance-critical communications service), determining whether the link quality metrics satisfy the one or more link quality thresholds, or both. Additionally or alternatively, the UE 115-*a* may select the cell bar time based on establishing the communications service, initiating/performing the first setup procedure with the first cell 205-*a*, determining the SIB read failure and/or RLF associated with the first cell 205-*a*, or any combination thereof.

In some aspects, the UE 115-*a* may select the cell bar time from a set of cell bar times configured at the UE 115-*a* and/or from a set of cell bar times associated with the first cell 205-*a*. For example, the UE 115-*a* may be configured with a default cell bar time associated with the first cell 205-*a* and one or more additional cell bar times (e.g., one or more shortened cell bar times). In some aspects, the default cell bar time may include 30 seconds, 300 seconds, or some other duration. Comparatively, the one or more additional/shortened cell bar times may include 3 seconds, 7 seconds, or some other duration shorter than the default cell bar time.

In some cases, the UE 115-*a* may select a cell bar time which is different from a default cell bar time based on the communications service including a performance-critical communications service (e.g., VoLTE call, VoNR call, gaming communications service), based on the one or more link quality metrics satisfying the one or more link quality thresholds (e.g., determining $RSRP_{Cell} \leq Thresh_{RSRP}$, $RSRQ_{Cell} \leq Thresh_{RSRQ}$, $SNR_{Cell} \leq Thresh_{SNR}$, $SINR_{Cell} \leq Thresh_{SINR}$, $Error_{FTL} \geq Thresh_{FTL}$, or $Error_{TTL} \geq Thresh_{TTL}$), or both. In additional or alternative cases, the UE 115-*a* may select the cell bar time (e.g., shortened cell bar time) which is different from a default cell bar time if the communications service includes a performance-critical communications service even if the link quality threshold(s) are not satisfied. Conversely, in other cases, the UE 115-*a* may select the cell bar time (e.g., shortened cell bar time) which is different from a default cell bar time if the link quality threshold(s) are satisfied even if the communications service does not include a performance-critical communications service.

For example, the UE 115-*a* may determine that the communications service does not include a performance-critical communications service. In such cases, the UE 115-*a* may select a cell bar time (e.g., shortened cell bar time) if the link quality metric(s) satisfy the link quality threshold(s) (e.g., select shortened cell bar time if $RSRP_{Cell} \leq Thresh_{RSRP}$, $RSRQ_{Cell} \leq Thresh_{RSRQ}$). Conversely, the UE 115-*a* may select a second cell bar time (e.g., default cell bar time) if the link quality metric(s) fail to satisfy the link quality threshold(s) (e.g., select shortened cell bar time if $RSRP_{Cell} > Thresh_{RSRP}$, $RSRQ_{Cell} > Thresh_{RSRQ}$). By way of another example, in cases where the link quality metric(s) fail to satisfy the link quality threshold(s), the UE 115-*a* may select a shortened cell bar time if the communications service includes a performance-critical communications service, and may select a default cell bar time if the communications service does not include a performance-critical communications service.

In some cases, the UE 115-*a* may compare the link quality metric(s) to multiple link quality thresholds, and may select the cell bar time based on which link quality thresholds and/or a quantity of link quality thresholds are met. For example, the UE 115-*a* may be configured with a first shortened cell bar time (e.g., 7 second cell bar time) and a second shortened cell bar time (e.g., 3 second cell bar time). In this example, the UE 115-*a* may select the cell bar time from the first shortened cell bar time and the second shortened cell bar time dependent upon which link quality thresholds are met. For instance, the UE 115-*a* may select the first shortened cell bar time if the link quality metric satisfies a first link quality threshold, but fails to satisfy a second link quality threshold (e.g., select first shortened cell bar time if $RSRP_{Cell} \leq Thresh_{RSRP\ 1}$, but $RSRP_{Cell} > Thresh_{RSRP\ 2}$). Comparatively, the UE 115-*a* may select the second shortened cell bar time if the link quality metric satisfies both the first link quality threshold and the second link quality threshold (e.g., select second shortened cell bar time if $RSRP_{Cell} \leq Thresh_{RSRP\ 1}$ and $RSRP_{Cell} \leq Thresh_{RSRP\ 2}$). Additionally or alternatively, the UE 115-*a* may select a first shortened cell bar time if the communications service includes a performance-critical communications service, and a second shortened cell bar time if the link quality metric satisfies one or more link quality thresholds.

In some aspects, the UE 115-*a* may add the first cell 205-*a* to a list of barred cells 205 (and/or remove the first cell 205-*a* from a list of available cells 205). In some aspects, the UE 115-*a* may add the first cell 205-*a* to the list of barred cells 205 based on the selected cell bar time. In particular, the UE 115-*a* may add the first cell 205-*a* to the list of barred cells 205 for a duration of the selected cell bar time. In this regard, the UE 115-*a* may add the first cell 205-*a* to the list of barred cells for a longer duration (e.g., 30 seconds, 300 seconds) in cases where the UE 115-*a* selects the default cell bar time, and may add the first cell 205-*a* to the list of barred cells for a shorter duration (e.g., 3 seconds, 7 seconds, 10 seconds) in cases where the UE 115-*a* selects a shortened cell bar time.

In some cases, the UE 115-*a* may initiate a cell reselection procedure. By initiating the cell reselection procedure, the UE 115-*a* may scan for other cells 205 and attempt to attach (e.g., camp) on cells 205 which are not included in the list of barred cells 205. In this regard, the UE 115-*a* may initiate the cell reselection procedure based on selecting the cell bar time, adding the first cell 205-*a* to the list of barred cells 205, or both. Additionally or alternatively, the UE 115-*a* may initiate the cell reselection procedure based on establishing the communications service, initiating/performing the first setup procedure with the first cell 205-*a*, determining the SIB read failure and/or RLF associated with the first cell 205-*a*, determining the type of communications service, determining the one or more link quality metrics, comparing the link quality metrics to link quality thresholds, any combination thereof.

In performing the cell reselection procedure, the UE 115-*a* may scan for other cells 205 (e.g., second cell 205-*b*). In particular, the UE 115-*a* may scan for cells 205 which are different from the first cell 205-*a* and which are not included within the list of barred cells 205. For example, the UE 115-*a* may scan for the second cell 205-*b* which is different from the first cell 205-*a*. In some aspects, the UE 115-*a* may scan for other cells 205 based on selecting the cell bar time, adding the first cell 205-*a* to the list of barred cells 205, or both. In some cases, the UE 115-*a* may scan for other cells 205 as part of the cell reselection procedure. Accordingly, in some cases, the UE 115-*a* may scan for cells 205 different from the first cell 205-*a* for a duration of the selected cell bar time selected. In some cases, the UE 115-*a* may initiate a setup procedure with the second cell 205-*b*, establish a connection with the second cell 205-*b*, or both, based on scanning for the second cell 205-*b*. Conversely, in cases where the UE 115-*a* is unable to attach/camp on another cell 205 (e.g., second cell 205-*b*), a “no service” indication may be indicated to the NAS layer of the UE 115-*a*.

In some aspects, the UE 115-*a* may determine an expiration of the selected cell bar time. In this regard, the UE 115-*a* may determine an expiration of the selected cell bar time based on a duration of the selected cell bar time and a time at which the selected cell bar time was selected and/or initiated. For example, in cases where the UE 115-*a* selects a shortened cell bar time with a duration of 7 seconds, the UE 115-*a* may determine an expiration of the shortened cell bar time 7 seconds after selecting the shortened cell bar time, 7 seconds after adding the first cell 205-*a* to the list of barred cells, or both. In some cases, the UE 115-*a* may remove the first cell 205-*a* from the list of barred cells 205 based on determining the expiration of the cell bar time. For example, upon determining the expiration of the cell bar time, the UE 115-*a* may remove the first cell 205-*a* from the list of barred cells such that the UE 115-*a* may attempt to attach to (e.g., camp on) the first cell 205-*a* once again.

In some aspects, the UE 115-*a* may perform (e.g., initiate) a second setup procedure with the first cell 205-*a*. In some aspects, the UE 115-*a* may initiate the second setup procedure with the first cell 205-*a* based on removing the first cell 205-*a* from the list of barred cells 205. In some aspects, the UE 115-*a* may establish (re-establish) a wireless connection with the first cell 205-*a* based on initiating the second setup procedure with the first cell 205-*a*. In some cases, by adding the first cell 205-*a* to the list of barred cells for a shorter duration (e.g., for a duration of a shortened cell bar time), techniques described herein may enable the UE 115-*a* to attempt to re-establish a connection with the first cell 205-*a* after a shorter duration in cases where it is not able to establish a connection with another cell 205 during the cell bar time, which may thereby reduce a duration of time that the UE 115-*a* spends out of service.

The techniques described herein may provide for improved wireless communications by reducing durations in which the UE 115-*a* is out of service. In particular, by selecting shorter cell bar times, techniques described herein may enable the UE 115-*a* to scan for new cells 205 and enable the UE 115-*a* to re-attempt communications with the barred cell 205 (e.g., first cell 205-*a*) after a short duration, which may reduce the time the UE 115-*a* is out of service and prevent failure of performance-critical communications services. By reducing a time the UE 115-*a* is out of service, techniques described herein may reduce power consumption at the UE 115-*a*, restore service in a more timely manner, and improve user experience.

Figure 3:
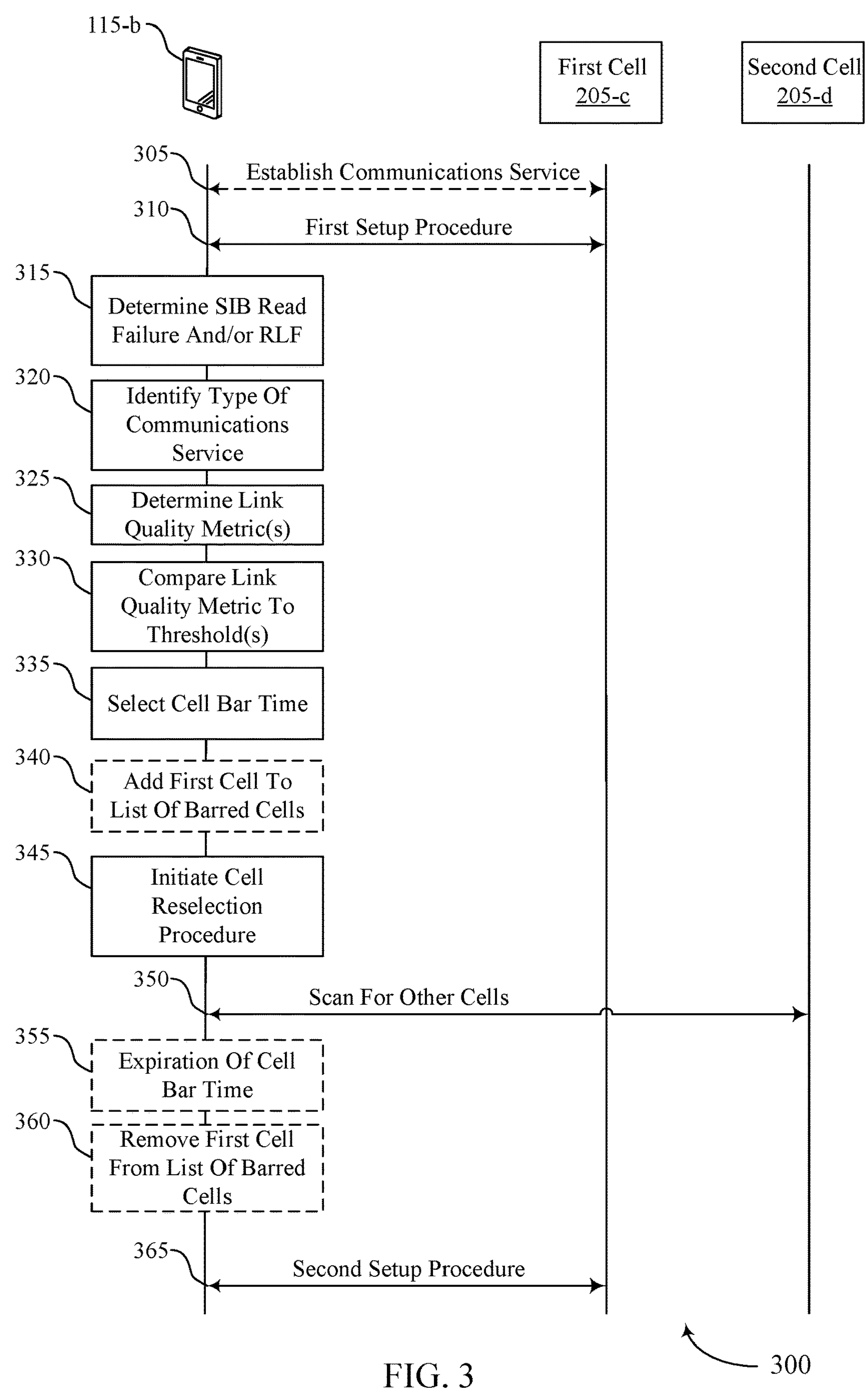
FIG. 3 illustrates an example of a process flow that supports techniques for cell bar time selection in accordance with aspects of the present disclosure.

FIG. 3 illustrates an example of a process flow 300 that supports techniques for cell bar time selection in accordance with aspects of the present disclosure. In some examples, process flow 300 may implement, or be implemented by, aspects of wireless communications system 100, wireless communications system 200, or both. For example, the process flow 300 may illustrate a UE 115-*b* determining a SIB read failure and/or RLF associated with a first cell 205-*c*, determining a type of communications service and link quality metrics, and selecting a cell bar time based on the type of communications service, the link quality metrics, or both, as described with reference to FIGS. 1-2, among other aspects.

The process flow 300 may include a UE 115-*b*, a first cell 205-*c*, and a second cell 205-*d*, which may be examples of UEs 115 and cells 205 as described with reference to FIGS. 1 and 2. In some aspects, the first cell 205-*c* and the second cell 205-*d* may be associated with (e.g., supported by) a single base station 105 of a wireless communications system (e.g., base station 105-*a* illustrated in FIG. 2). Additionally or alternatively, the first cell 205-*c* and the second cell 205-*d* may be associated with (e.g., supported by) different base stations 105.

In some examples, the operations illustrated in process flow 300 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 305, the UE 115-*b* may establish a communications service. In some aspects, the UE 115-*b* may establish the communications service while operating in a connected mode of operation. Moreover the UE 115-*b* may establish the communications service at 305 with the first cell 205-*c*, the second cell 205-*d*, or both. The communications service may include any communications service known in the art including, but not limited to, a VoLTE call, a VoNR call, a gaming communications service, a web browsing communications service, or any combination thereof.

At 310, the UE 115-*b* may initiate, or otherwise perform, a first setup procedure with the first cell 205-*c* supported by a base station 105. For example, the first UE 115-*b* may initiate an attachment procedure with the first cell 205-*c*. In some aspects, the UE 115-*b* may initiate the first setup procedure after establishing the communications service at 305. In some aspects, the first cell 205-*c* may be associated with a default cell bar time. The default cell bar time may define a time duration in which UEs 115 are to bar the first cell 205-*c* from a list of available cells in the event that a failure associated with the first cell 205-*c* is identified, or if the first cell 205-*c* is otherwise found to be problematic. In some cases, the default cell bar time may include 30 seconds, 300 seconds, or another duration.

At 315, the UE 115-*b* may determine a SIB read failure, an RLF, or both, associated with the first cell 205-*c*. In some aspects, the UE 115-*b* may determine the SIB read failure and/or the RLF at 315 based on establishing the communications service in the connected mode of operation at 305, performing (e.g., initiating) the first setup procedure with the first cell 205-*c* at 310, or both. For example, the UE 115-*b* may determine (e.g., observe) a mandatory SIB read failure while a timer (e.g., timer T311) is running. By way of another example, the UE 115-*b* may identify poor wireless communications conditions which results in repeated RLFs while operating in the connected mode of operation.

At 320, the UE 115-*b* may identify/determine a type of a communications service which was established at 305. In this regard, the UE 115-*b* may identify a type of a communications service which was established with the first cell 205-*c* supported by a base station 105. In some cases, the UE 115-*b* may determine whether the type of the communications service is one of a set of predefined performance-critical communications services. The set of predefined performance-critical communications services may include, but is not limited to, VoLTE calls, VoNR calls, gaming communications services, or any combination thereof. In this regard, the UE 115-*b* may determine whether the communications service established at 305 includes a VoLTE call, a VoNR call, a gaming communications service, or any combination thereof.

In some aspects, the UE 115-*b* may determine the type of the communications service based on one or more parameters or characteristics associated with the communications service. Parameters or characteristics associated with the communications service which may be used to determine the type of the communications service may include, but are not limited to, a type of bearer(s) associated with the communications service, the quantity of bearer(s) associated with the communications service, a latency metric associated with the communications service, a QoS metric associated with the communications service, a reliability metric associated with the communications service, or any combination thereof. For example, the bearers and/or type of bearers associated with the communications service may indicate that the communications service includes a performance-critical communications service. By way of another example, lower latency metrics, higher QoS metrics, and/or higher reliability metrics may be indicative of a performance-critical communications service, as compared to higher latency metrics, lower QoS metrics, and/or lower reliability metrics.

In additional or alternative aspects, the UE 115-*b* may determine the type of the communications service based on signaling from a higher layer of the UE 115-*b*. For example, a component (e.g., modem, processor) of the UE 115-*b* may receive, from a higher layer of the UE 115-*b* (e.g., MAC layer, application layer), an indication of the type of the communications service. In this regard, higher-layer signaling may indicate whether or not the communications service includes a performance-critical communications service. Similarly, the UE 115-*b* may determine the type of communications service based on signaling from an application or program executed by the UE 115-*b*. For example, the UE 115-*b* may establish a gaming communications service by executing a gaming application ("app") of the UE 115-*b*. In this example, the gaming application may indicate, to a component of the UE 115-*b* (e.g., modem, processor), that the gaming communications service includes a performance-critical communications service.

At 325, the UE 115-*b* may determine one or more link quality metrics associated with communications between the UE 115-*b* and the first cell 205-*c*. For example, the UE 115-*b* may perform a set of measurements on signals received from the first cell 205-*c* (e.g., signals received from the base station 105 supporting the first cell 205-*c*), and may determine the one or more link quality metrics based on the set of measurements. The link quality metrics may include, but are not limited to, an RSRP metric, an RSRQ metric, an SNR metric, a SINR metric, or any combination thereof. In some aspects, the UE 115-*b* may determine the one or more link quality metrics at 325 based on establishing the communications service at 305, initiating/performing the first setup procedure at 310, determining the SIB read failure and/or RLF at 315, determining the type of communications service at 320, or any combination thereof.

At 330, the UE 115-*b* may compare the one or more link quality metrics associated with communications between the UE 115-*b* and the first cell 205-*c* to determine whether the one or more link quality metrics satisfy one or more link quality thresholds. The one or more link quality thresholds may include, but are not limited to, RSRP thresholds, RSRQ thresholds, SNR thresholds, SINR thresholds, FTL error, TTL error, or any combination thereof. In some aspects, the UE 115-*b* may perform the comparison at 330 based on establishing the communications service at 305, initiating/performing the first setup procedure at 310, determining the SIB read failure and/or RLF at 315, determining the type of communications service at 320, determining the one or more link quality thresholds, or any combination thereof.

In some aspects, the UE 115-*b* may determine that a respective link quality metric "satisfies" a respective link quality threshold if the link quality metric indicates a link quality associated with the first cell 205-*c* is less than (e.g., worse than), or less than or equal to, the respective link quality threshold. For example, in the case of signal measurement (e.g., RSRP RSRQ, SNR, or SINR) metrics, the UE 115-*b* may determine that the metrics satisfy a respective threshold if they are less than or equal to the respective threshold (e.g., link quality thresholds satisfied if $RSRP_{Cell}\leq Thresh_{RSRP}$ and/or $RSRQ_{Cell}\leq Thresh_{RSRQ}$, $SNR_{Cell}\leq Thresh_{SNR}$, and/or $SINR_{Cell}\leq Thresh_{SINR}$). Alternatively, the UE 115-*b* may determine that a respective link quality metric "satisfies" a respective link quality threshold if the link quality metric indicates a link quality associated with the first cell 205-*c* is greater than, or greater than or equal to, the respective link quality threshold. For example, in the case of error metrics, the UE 115-*b* may determine that the error metrics satisfy a respective threshold if they are greater than, or greater than or equal to the respective threshold (e.g., error thresholds satisfied if $\text{Error}_{FTL} \geq \text{Thresh}_{FTL}$, or $\text{Error}_{TTL} \geq \text{Thresh}_{TTL}$).

At 335, the UE 115-*b* may select a cell bar time. In particular, the UE 115-*b* may select the cell bar time at 335 based on the type of communications service determined at 320, determining whether the link quality metrics satisfy the one or more link quality thresholds at 330, or both. Additionally or alternatively, the UE 115-*b* may select the cell bar time based on establishing the communications service at 305, initiating/performing the first setup procedure at 310, determining the SIB read failure and/or RLF at 315, or any combination thereof. In some aspects, the UE 115-*b* may select the cell bar time from a set of cell bar times configured at the UE 115-*b*. For example, the UE 115-*b* may be configured with a default cell bar time and one or more additional cell bar times (e.g., one or more shortened cell bar times). In some aspects, the default cell bar time may include 30 seconds, 300 seconds, or some other duration. Comparatively, the one or more additional/shortened cell bar times may include 3 seconds, 7 seconds, or some other duration.

In some cases, the UE 115-*b* may select a cell bar time which is different from a default cell bar time based on the communications service including a performance-critical communications service (e.g., VoLTE call, VoNR call, gaming communications service), based on the one or more link quality metrics satisfying the one or more link quality thresholds (e.g., determining $\text{RSRP}_{Cell} \leq \text{Thresh}_{RSRP}$, $\text{RSRQ}_{Cell} \leq \text{Thresh}_{RSRQ}$, $\text{SNR}_{Cell} \leq \text{Thresh}_{SNR}$, $\text{SINR}_{Cell} \leq \text{Thresh}_{SINR}$, $\text{Error}_{FTL} \geq \text{Thresh}_{FTL}$, or $\text{Error}_{TTL} \geq \text{Thresh}_{TTL}$), or both. In additional or alternative cases, the UE 115-*b* may select the cell bar time (e.g., shortened cell bar time) which is different from a default cell bar time if the communications service includes a performance-critical communications service even if the link quality threshold(s) are not satisfied. In some cases, the UE 115-*b* may select different cell bar times (e.g., different shortened cell bar times) for different communication services. For example, different cell bar times may be selected based on different categories (e.g., a voice call, a gaming communications service). Conversely, in other cases, the UE 115-*b* may select the cell bar time (e.g., shortened cell bar time) which is different from a default cell bar time if the link quality threshold(s) are satisfied even if the communications service does not include a performance-critical communications service.

For example, the UE 115-*b* may determine that the communications service does not include a performance-critical communications service at 320. In such cases, the UE 115-*b* may select a cell bar time (e.g., shortened cell bar time) if the link quality metric(s) satisfy the link quality threshold(s) at 330 (e.g., select shortened cell bar time if $\text{RSRP}_{Cell} \leq \text{Thresh}_{RSRP}$, $\text{RSRQ}_{Cell} \leq \text{Thresh}_{RSRQ}$). Conversely, the UE 115-*b* may select a second cell bar time (e.g., default cell bar time) if the link quality metric(s) fail to satisfy the link quality threshold(s) at 330 (e.g., select shortened cell bar time if $\text{RSRP}_{Cell} > \text{Thresh}_{RSRP}$, $\text{RSRQ}_{Cell} > \text{Thresh}_{RSRQ}$). By way of another example, in cases where the link quality metric(s) fail to satisfy the link quality threshold(s) at 330, the UE 115-*b* may select a shortened cell bar time if the communications service includes a performance-critical communications service, and may select a default cell bar time if the communications service does not include a performance-critical communications service.

In some cases, the UE 115-*b* may compare the link quality metric(s) to multiple link quality thresholds at 330, and may select the cell bar time at 335 based on which link quality thresholds and/or a quantity of link quality thresholds are met. For example, the UE 115-*b* may be configured with a first shortened cell bar time (e.g., 7 second cell bar time) and a second shortened cell bar time (e.g., 3 second cell bar time). In this example, the UE 115-*b* may select the cell bar time at 330 from the first shortened cell bar time and the second shortened cell bar time dependent upon which link quality thresholds are met. For instance, the UE 115-*b* may select the first shortened cell bar time if the link quality metric satisfies a first link quality threshold, but fails to satisfy a second link quality threshold (e.g., select first shortened cell bar time if $\text{RSRP}_{Cell} \leq \text{Thresh}_{RSRP\ 1}$, but $\text{RSRP}_{Cell} > \text{Thresh}_{RSRP\ 2}$). Comparatively, the UE 115-*b* may select the second shortened cell bar time if the link quality metric satisfies both the first link quality threshold and the second link quality threshold (e.g., select second shortened cell bar time if $\text{RSRP}_{Cell} \leq \text{Thresh}_{RSRP\ 1}$ and $\text{RSRP}_{Cell} \leq \text{Thresh}_{RSRP\ 2}$).

At 340, the UE 115-*b* may add the first cell 205-*c* to a list of barred cells 205 (and/or remove the first cell 205-*c* from a list of available cells 205). In some aspects, the UE 115-*b* may add the first cell 205-*c* to the list of barred cells 205 based on the selected cell bar time. In particular, the UE 115-*b* may add the first cell 205-*c* to the list of barred cells 205 for a duration of the selected cell bar time which was selected at 335. In this regard, the UE 115-*b* may add the first cell 205-*c* to the list of barred cells for a longer duration (e.g., 30 seconds, 300 seconds) in cases where the UE 115-*b* selects the default cell bar time at 335, and may add the first cell 205-*c* to the list of barred cells for a shorter duration (e.g., 3 seconds, 7 seconds, 10 seconds) in cases where the UE 115-*b* selects a shortened cell bar time at 335.

At 345, the UE 115-*b* may initiate a cell reselection procedure. By initiating the cell reselection procedure, the UE 115-*b* may scan for other cells 205 and attempt to attach (e.g., camp) on cells 205 which are not included in the list of barred cells 205. In this regard, the UE 115-*b* may initiate the cell reselection procedure at 345 based on selecting the cell bar time at 335, adding the first cell 205-*c* to the list of barred cells 205 at 340, or both. Additionally or alternatively, the UE 115-*b* may initiate the cell reselection procedure based on establishing the communications service at 305, initiating/performing the first setup procedure at 310, determining the SIB read failure and/or RLF at 315, determining the type of communications service at 320, determining the one or more link quality metrics at 325, comparing the link quality metrics to link quality thresholds at 330, any combination thereof.

At 350, the UE 115-*b* may scan for other cells 205. In particular, the UE 115-*b* may scan for cells 205 which are different from the first cell 205-*c* and which are not included within the list of barred cells 205. For example, as shown in FIG. 3, the UE 115-*b* may scan for the second cell 205-*d* which is different from the first cell 205-*c*. In some aspects, the UE 115-*b* may scan for other cells 205 based on selecting the cell bar time at 335, adding the first cell 205-*c* to the list of barred cells 205 at 340, or both. In some cases, the UE 115-*b* may scan for other cells 205 as part of the cell reselection procedure. Accordingly, in some cases, the UE 115-*b* may scan for cells 205 different from the first cell 205-*c* for a duration of the selected cell bar time selected at 335. In some cases, the UE 115-*b* may initiate a setup procedure with the second cell 205-*d*, establish a connection with the second cell 205-*b*, or both, based on scanning for the second cell 205-*d* at 350. Conversely, in cases where the UE 115-*b* is unable to attach/camp on another cell 205 (e.g., second cell 205-*b*), a "no service" indication may be indicated to the NAS layer of the UE 115-*b*.

At 355, the UE 115-*b* may determine an expiration of the selected cell bar time. In this regard, the UE 115-*b* may determine an expiration of the selected cell bar time based on a duration of the selected cell bar time and a time at which the selected cell bar time was selected and/or initiated. For example, in cases where the UE 115-*b* selects a shortened cell bar time with a duration of 7 seconds, the UE 115-*b* may determine an expiration of the shortened cell bar time 7 seconds after selecting the shortened cell bar time, 7 seconds after adding the first cell 205-*c* to the list of barred cells, or both.

At 360, the UE 115-*b* may remove the first cell 205-*c* from the list of barred cells. In some aspects, the UE 115-*b* may remove the first cell 205-*c* from the list of barred cells based on determining the expiration of the cell bar time at 355. For example, upon determining the expiration of the cell bar time, the UE 115-*b* may remove the first cell 205-*c* from the list of barred cells such that the UE 115-*b* may attempt to attach to (e.g., camp on) the first cell 205-*c* once again.

At 365, the UE 115-*b* may perform (e.g., initiate) a second setup procedure with the first cell 205-*c*. In some aspects, the UE 115-*b* may initiate the second setup procedure with the first cell 205-*c* based on removing the first cell 205-*c* from the list of barred cells 205 at 360. In some aspects, the UE 115-*b* may establish (re-establish) a wireless connection with the first cell 205-*c* based on initiating the second setup procedure with the first cell 205-*c* at 365. In some cases, by adding the first cell 205-*c* to the list of barred cells for a shorter duration (e.g., for a duration of a shortened cell bar time), techniques described herein may enable the UE 115-*b* to attempt to re-establish a connection with the first cell more quickly in cases where it is not able to establish a connection with another cell 205 during the cell bar time, which may thereby reduce a duration of time that the UE 115-*b* spends out of service.

The techniques described herein may provide for improved wireless communications by reducing durations in which the UE 115-*b* is out of service. In particular, by selecting shorter cell bar times, techniques described herein may enable the UE 115-*b* to scan for new cells 205 and enable the UE 115-*b* to re-attempt communications with the barred cell 205 (e.g., first cell 205-*c*) after a short duration, which may reduce the time the UE 115-*b* is out of service and prevent failure of performance-critical communications services. By reducing a time the UE 115-*b* is out of service, techniques described herein may reduce power consumption at the UE 115-*b*, restore service in a more timely manner, and improve user experience.

Figure 4:
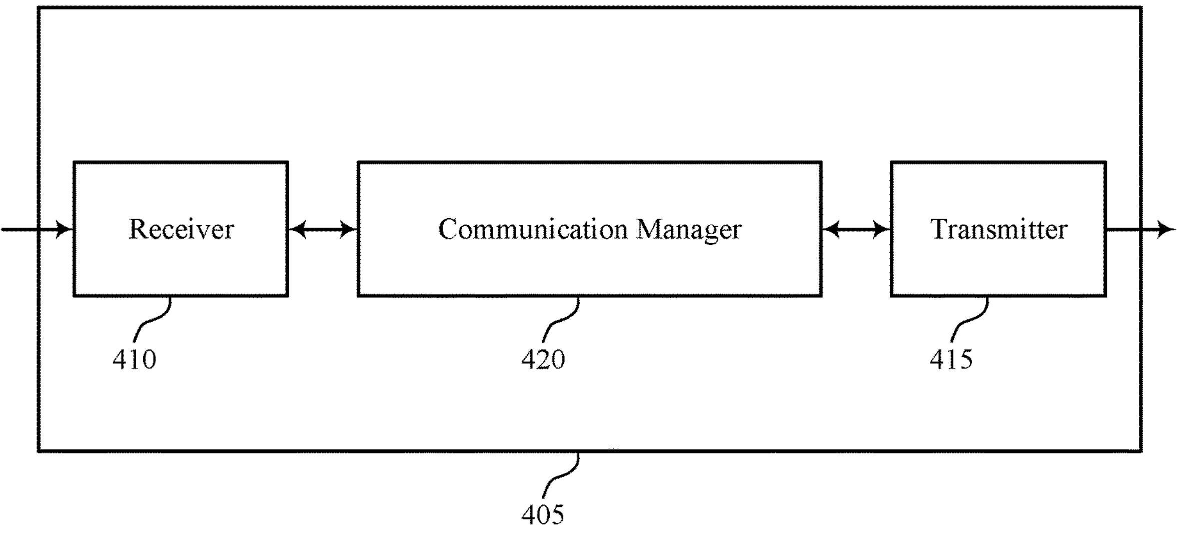
FIGS. 4 and 5 show diagrams of devices that support techniques for cell bar time selection in accordance with aspects of the present disclosure.

FIG. 4 shows a diagram 400 of a device 405 that supports techniques for cell bar time selection in accordance with aspects of the present disclosure. The device 405 may be an example of aspects of a UE 115 as described herein. The device 405 may include a receiver 410, a transmitter 415, and a communication manager 420. The device 405 may also include a processor. Each of these components may be in communication with one another (e.g., via one or more buses).

The receiver 410 may provide a means for receiving information such as packets, user data, or control information associated with various information channels (e.g., control channels, data channels, information related to techniques for cell bar time selection). Information may be passed on to other components of the device 405. The receiver 410 may utilize a single antenna or a plurality of antennas.

The transmitter 415 may provide a means for transmitting signals generated by other components of the device 405. In some examples, the transmitter 415 may be co-located with a receiver 410 in a transceiver module. The transmitter 415 may utilize a single antenna or a plurality of antennas.

The communication manager 420, the receiver 410, the transmitter 415, or various combinations thereof or various components thereof, may be an example of a means for performing various aspects of techniques for cell bar time selection as described herein.

In some examples, the communication manager 420, the receiver 410, the transmitter 415, or various combinations thereof or components thereof, may be implemented in hardware (e.g., in communications management circuitry). The circuitry may include a processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described in the present disclosure.

Additionally or alternatively, in some examples, the communication manager 420, the receiver 410, the transmitter 415, or various combinations thereof or components thereof, may be implemented in code (e.g., as communications management software or firmware) executed by a processor. If implemented in code executed by a processor, the functions of the communication manager 420, the receiver 410, the transmitter 415, or various combinations thereof or components thereof, may be executed by a general-purpose processor, a DSP, a central processing unit (CPU), an ASIC, an FPGA, or some other programmable logic device.

In some examples, the communication manager 420 may be configured to perform various operations (e.g., receiving, monitoring, transmitting) using or otherwise in cooperation with the receiver 410, the transmitter 415, or both.

The communication manager 420 may support wireless communication at a user equipment (UE) in accordance with examples as disclosed herein. For example, the communication manager 420 may be configured to provide or support a means for initiating a first setup procedure with a first cell supported by a base station. The communication manager 420 may be configured to provide or support a means for determining a SIB read failure, an RLF, or both, based at least in part on initiating the first setup procedure. The communication manager 420 may be configured to provide or support a means for identifying a type of a communications service established via the base station. The communication manager 420 may be configured to provide or support a means for determining whether a link quality metric associated with communications between the UE and the first cell satisfies a link quality threshold. The communication manager 420 may be configured to provide or support a means for selecting a cell bar time based at least in part on the type of the communications service, whether the link quality metric satisfies the link quality threshold, or both. The communication manager 420 may be configured to provide or support a means for initiating a cell reselection procedure based at least in part on the cell bar time.

By including or configuring the communication manager 420 in accordance with examples as described herein, the device 405 may support improved techniques for cell bar time selection. For example, by selecting shorter cell bar times, techniques described herein may enable the UE 115 to scan for new cells and enable the UE 115 to re-attempt communications with the barred cell after a short duration, which may reduce the time the UE 115 is out of service and prevent failure of performance-critical communications services. By reducing a time the UE 115 is out of service, techniques described herein may reduce power consumption at the UE 115, restore service in a more timely manner, and improve user experience.

Based on adaptively selecting cell bar times, a processor of the UE 115 (e.g., a processor controlling the receiver 410, the communication manager 420, the transmitter 415, etc.) may reduce processing resources used cell reselection procedures and/or cell attachment procedures. For example, by adaptively selecting cell bar times, techniques described herein may reduce a duration of time in which the UE 115 spends out of service, which may reduce power consumption and signaling which is associated with performing cell attachment procedures and/or cell reselection procedures. By reducing the power consumption, battery life of the UE 115 may be improved, and signaling associated with cell reselection procedures may be reduced, correspondingly reducing a number of times the processor ramps up processing power and turns on processing units to handle uplink transmission and/or downlink reception. Moreover, by reducing a duration of time in which the UE 115 spends out of service, service may be quickly reestablished at the UE 115, leading to improved user experience.

Figure 5:
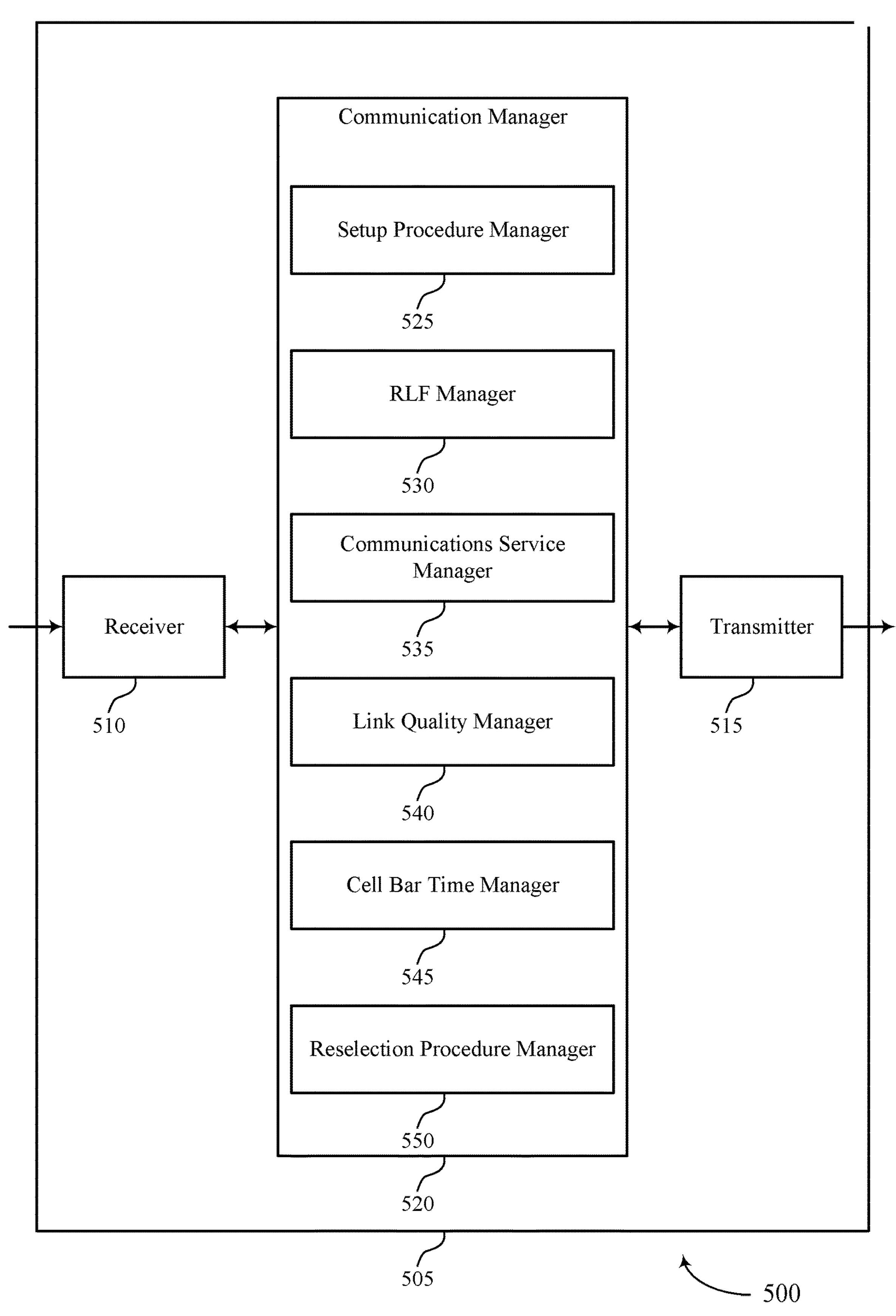

FIG. 5 shows a diagram 500 of a device 505 that supports techniques for cell bar time selection in accordance with aspects of the present disclosure. The device 505 may be an example of aspects of a device 405 or a UE 115 as described herein. The device 505 may include a receiver 510, a transmitter 515, and a communication manager 520. The device 505 may also include a processor. Each of these components may be in communication with one another (e.g., via one or more buses).

The receiver 510 may provide a means for receiving information such as packets, user data, or control information associated with various information channels (e.g., control channels, data channels, information related to techniques for cell bar time selection). Information may be passed on to other components of the device 505. The receiver 510 may utilize a single antenna or a plurality of antennas.

The transmitter 515 may provide a means for transmitting signals generated by other components of the device 505. In some examples, the transmitter 515 may be co-located with a receiver 510 in a transceiver module. The transmitter 515 may utilize a single antenna or a plurality of antennas.

The device 505, or various components thereof, may be an example of means for performing various aspects of techniques for cell bar time selection as described herein. For example, the communication manager 520 may include a setup procedure manager 525, an RLF manager 530, a communications service manager 535, a link quality manager 540, a cell bar time manager 545, a reselection procedure manager 550, or any combination thereof. The communication manager 520 may be an example of aspects of a communication manager 420 as described herein. In some examples, the communication manager 520, or various components thereof, may be configured to perform various operations (e.g., receiving, monitoring, transmitting) using or otherwise in cooperation with the receiver 510, the transmitter 515, or both.

The communication manager 520 may support wireless communication at a UE in accordance with examples as disclosed herein. The setup procedure manager 525 may be configured to provide or support a means for initiating a first setup procedure with a first cell supported by a base station. The RLF manager 530 may be configured to provide or support a means for determining a SIB read failure, an RLF, or both, based on initiating the first setup procedure. The communications service manager 535 may be configured to provide or support a means for identifying a type of a communications service established via the base station. The link quality manager 540 may be configured to provide or support a means for determining whether a link quality metric associated with communications between the UE and the first cell satisfies a link quality threshold. The cell bar time manager 545 may be configured to provide or support a means for selecting a cell bar time based on the type of the communications service, whether the link quality metric satisfies the link quality threshold, or both. The reselection procedure manager 550 may be configured to provide or support a means for initiating a cell reselection procedure based on the cell bar time.

Figure 6:
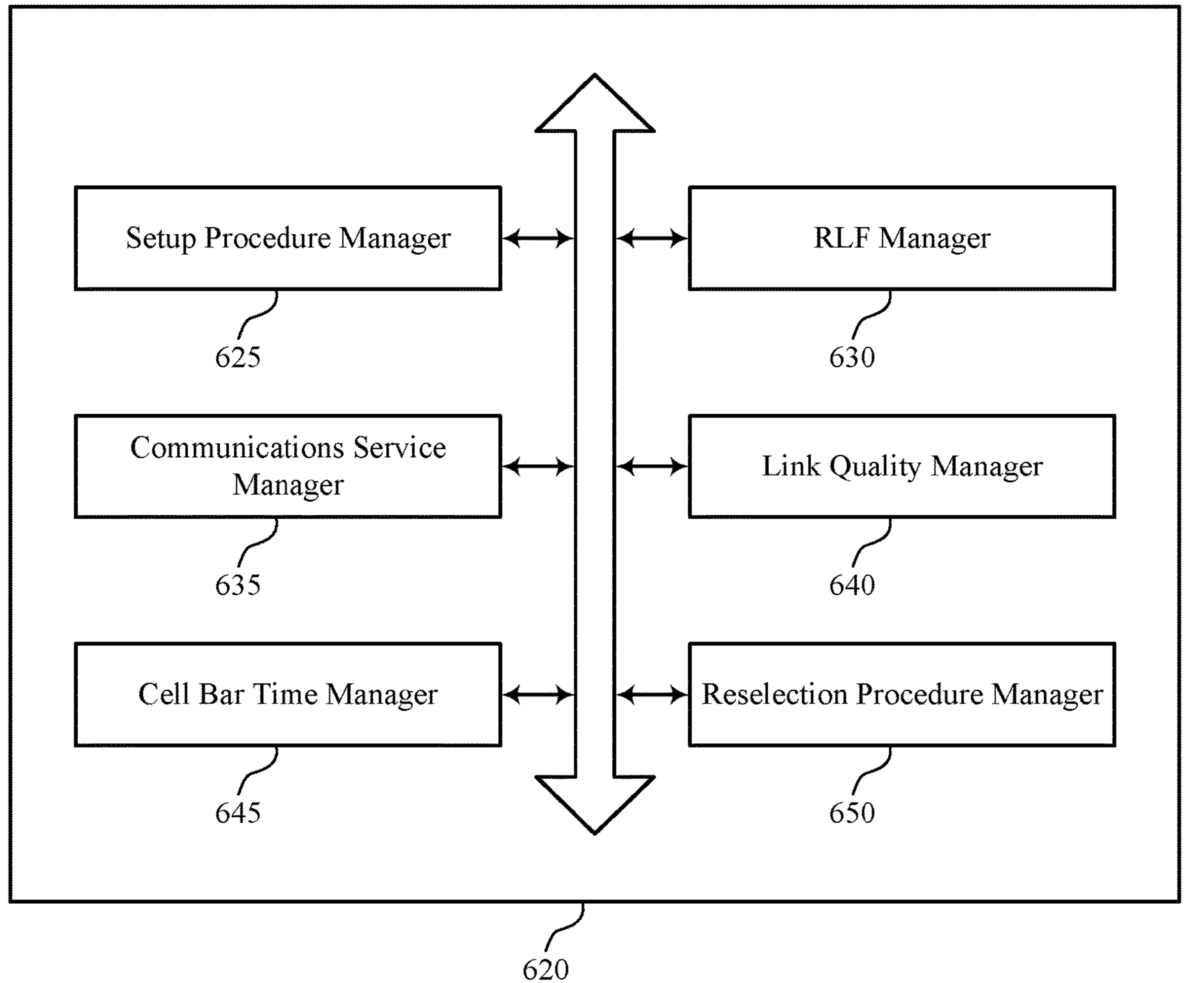
FIG. 6 shows a diagram of a communication manager that supports techniques for cell bar time selection in accordance with aspects of the present disclosure.

FIG. 6 shows a diagram 600 of a communication manager 620 that supports techniques for cell bar time selection in accordance with aspects of the present disclosure. The communication manager 620 may be an example of aspects of a communication manager 420, a communication manager 520, or both, as described herein. The communication manager 620, or various components thereof, may be an example of means for performing various aspects of techniques for cell bar time selection as described herein. For example, the communication manager 620 may include a setup procedure manager 625, an RLF manager 630, a communications service manager 635, a link quality manager 640, a cell bar time manager 645, a reselection procedure manager 650, or any combination thereof. Each of these components may communicate, directly or indirectly, with one another (e.g., via one or more buses).

The communication manager 620 may support wireless communication at a UE in accordance with examples as disclosed herein. The setup procedure manager 625 may be configured to provide or support a means for initiating a first setup procedure with a first cell supported by a base station. The RLF manager 630 may be configured to provide or support a means for determining a SIB read failure, an RLF, or both, based on initiating the first setup procedure. The communications service manager 635 may be configured to provide or support a means for identifying a type of a communications service established via the base station. The link quality manager 640 may be configured to provide or support a means for determining whether a link quality metric associated with communications between the UE and the first cell satisfies a link quality threshold. The cell bar time manager 645 may be configured to provide or support a means for selecting a cell bar time based on the type of the communications service, whether the link quality metric satisfies the link quality threshold, or both. The reselection procedure manager 650 may be configured to provide or support a means for initiating a cell reselection procedure based on the cell bar time.

In some examples, to initiate the cell reselection procedure based on the cell bar time, the cell bar time manager 645 may be configured to provide or support a means for adding the first cell to a list of barred cells based on selecting the cell bar time. In some examples, to initiate the cell reselection procedure based on the cell bar time, the reselection procedure manager 650 may be configured to provide or support a means for scanning for cells different from the first cell based on adding the first cell to the list of barred cells.

In some examples, the cell bar time manager 645 may be configured to provide or support a means for determining an expiration of the cell bar time. In some examples, the cell bar time manager 645 may be configured to provide or support a means for removing the first cell from the list of barred cells based on determining the expiration of the cell bar time. In some examples, the setup procedure manager 625 may be configured to provide or support a means for initiating a second setup procedure with the first cell based on removing the first cell from the list of barred cells.

In some examples, the communications service manager 635 may be configured to provide or support a means for determining whether the type of the communications service is one of a set of predefined performance-critical communications services.

In some examples, selecting the cell bar time is based on determining that the type of the communications service is one of the set of predefined performance-critical communications services.

In some examples, the predefined set of communications services includes a voice over Long Term Evolution (VoLTE) call, a voice over New Radio (VoNR) call, a gaming communications service, or any combination thereof.

In some examples, the cell bar time manager 645 may be configured to provide or support a means for selecting a second cell bar time different from the cell bar time if the link quality metric fails to satisfy the link quality threshold. In some examples, the cell bar time manager 645 may be configured to provide or support a means for selecting the cell bar time if the link quality metric satisfies the link quality threshold.

In some examples, the cell bar time is shorter than the second cell bar time.

In some examples, the cell bar time manager 645 may be configured to provide or support a means for determining a set of cell bar times. In some examples, the link quality manager 640 may be configured to provide or support a means for determining that the link quality metric satisfies the link quality threshold. In some examples, the link quality manager 640 may be configured to provide or support a means for determining that the link quality metric fails to satisfy a second link quality threshold different from the link quality threshold. In some examples, the cell bar time manager 645 may be configured to provide or support a means for selecting the cell bar time from the set of cell bar times based on determining the link quality metric satisfies the link quality threshold and fails to satisfy the second link quality threshold.

In some examples, the link quality manager 640 may be configured to provide or support a means for determining an RSRP metric associated with the first cell, an RSRQ metric associated with the first cell, an SNR metric associated with the first cell, an SINR metric associated with the first cell, or any combination thereof, where the link quality metric includes the RSRP metric, the RSRQ metric, the SNR metric, the SINR metric, or any combination thereof.

In some examples, the communications service manager 635 may be configured to provide or support a means for determining a type of bearer associated with the communications service, a latency metric associated with the communications service, a quality of service metric associated with the communications service, a reliability metric associated with the communications service, or any combination thereof, where determining the type of the communications service is based on the determined type of bearer, the determined latency metric, the determined quality of service metric, the determined reliability metric, or any combination thereof.

In some examples, the communications service manager 635 may be configured to provide or support a means for receiving, from a higher layer of the UE, an indication of the type of the communications service, where determining the type of the communications service is based on receiving the indication from the higher layer of the UE.

In some examples, the communications service manager 635 may be configured to provide or support a means for establishing the communications service in a connected mode of operation prior to initiating the first setup procedure, where determining the SIB read failure, the RLF, or both, is based on establishing the communications service in the connected mode of operation.

Figure 7:
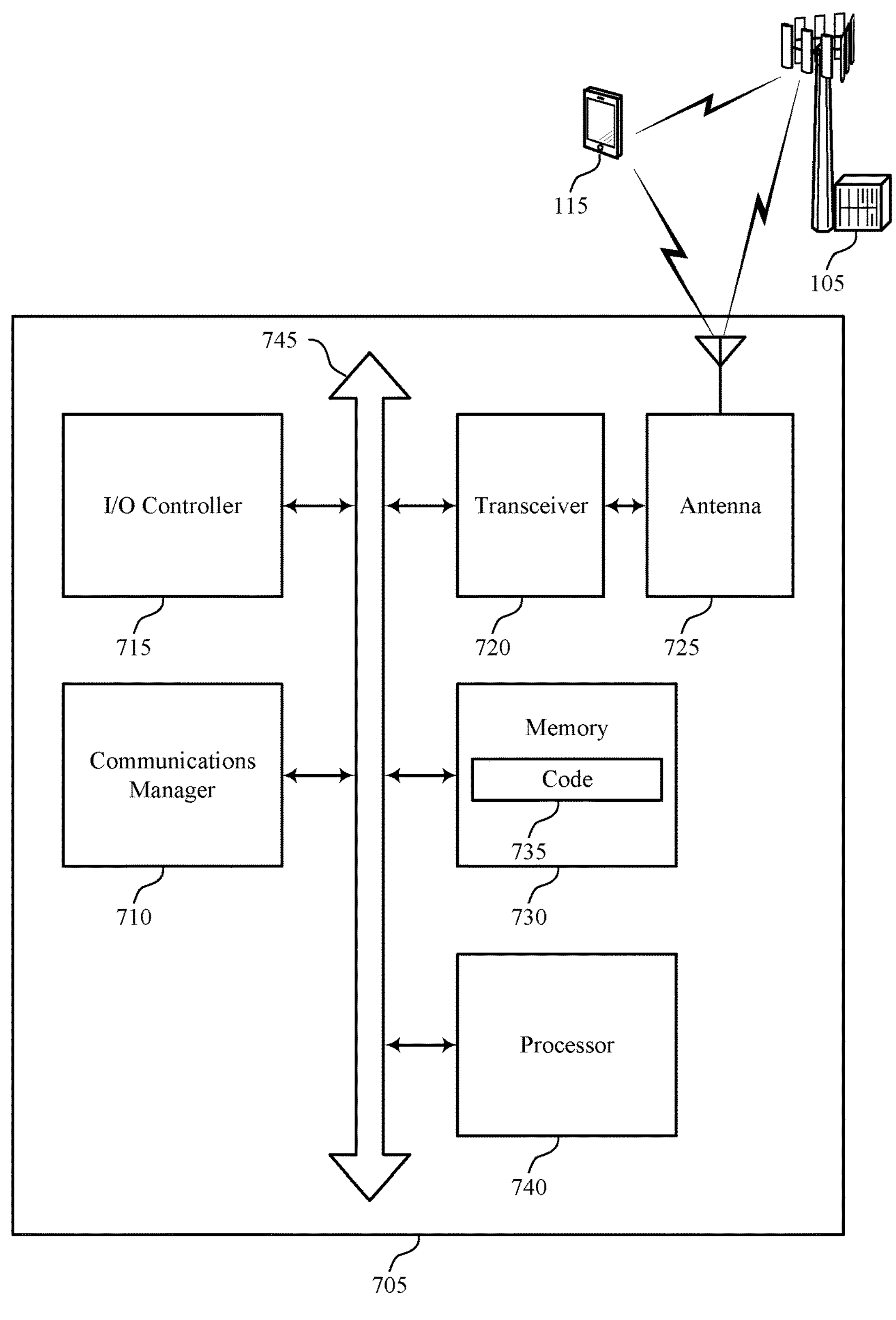
FIG. 7 shows a diagram of a system including a device that supports techniques for cell bar time selection in accordance with aspects of the present disclosure.

FIG. 7 shows a diagram of a system 700 including a device 705 that supports techniques for cell bar time selection in accordance with aspects of the present disclosure. The device 705 may be an example of or include the components of device, device 505, or a UE 115 as described herein. The device 705 may communicate wirelessly with one or more base stations 105, UEs 115, or any combination thereof. The device 705 may include components for bi-directional voice and data communications including components for transmitting and receiving communications, including a communication manager 710, a I/O controller 715, a transceiver 720, an antenna 725, a memory 730, a code 735, and a processor 740. These components may be in electronic communication or otherwise coupled (e.g., operatively, communicatively, functionally, electronically, electrically) via one or more buses (e.g., bus 745).

The I/O controller 715 may manage input and output signals for device 705. The I/O controller 715 may also manage peripherals not integrated into device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with device 705 via the I/O controller 715 or via hardware components controlled by the I/O controller 715.

In some cases, the device 705 may include a single antenna 725. However, in some cases the device may have more than one antenna 725, which may be capable of concurrently transmitting or receiving multiple wireless transmissions. The transceiver 720 may communicate bi-directionally, via the one or more antennas 725, wired, or wireless links as described herein. For example, the transceiver 720 may represent a wireless transceiver and may communicate bi-directionally with another wireless transceiver. The transceiver 720 may also include a modem to modulate the packets and provide the modulated packets to one or more antennas 725 for transmission, and to demodulate packets received from the one or more antennas 725. The transceiver 720, or the transceiver 720 and one or more antennas 725, may be an example of a transmitter 415, a transmitter 515, a receiver 410, a receiver 510, or any combination thereof or component thereof, as described herein.

The memory 730 may include random-access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or other type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting techniques for cell bar time selection).

The communication manager 710 may support wireless communication at a UE in accordance with examples as disclosed herein. For example, the communication manager 710 may be configured to provide or support a means for initiating a first setup procedure with a first cell supported by a base station. The communication manager 710 may be configured to provide or support a means for determining a SIB read failure, an RLF, or both, based on initiating the first setup procedure. The communication manager 710 may be configured to provide or support a means for identifying a type of a communications service established via the base station. The communication manager 710 may be configured to provide or support a means for determining whether a link quality metric associated with communications between the UE and the first cell satisfies a link quality threshold. The communication manager 710 may be configured to provide or support a means for selecting a cell bar time based on the type of the communications service, whether the link quality metric satisfies the link quality threshold, or both. The communication manager 710 may be configured to provide or support a means for initiating a cell reselection procedure based on the cell bar time.

By including or configuring the communication manager 710 in accordance with examples as described herein, the device 705 may support improved techniques for cell bar time selection. For example, by selecting shorter cell bar times, techniques described herein may enable the UE 115 to scan for new cells and enable the UE 115 to re-attempt communications with the barred cell after a short duration, which may reduce the time the UE 115 is out of service and prevent failure of performance-critical communications services. By reducing a time the UE 115 is out of service, techniques described herein may reduce power consumption at the UE 115, restore service in a more timely manner, and improve user experience.

In some examples, the communication manager 710 may be configured to perform various operations (e.g., receiving, monitoring, transmitting) using or otherwise in cooperation with the transceiver 720, the one or more antennas 725, or any combination thereof. Although the communication manager 710 is illustrated as a separate component, in some examples, one or more functions described with reference to the communication manager 710 may be supported by or performed by the processor 740, the memory 730, the code 735, or any combination thereof. For example, the code 735 may include instructions executable by the processor 740 to cause the device 705 to perform various aspects of techniques for cell bar time selection as described herein, or the processor 740 and the memory 730 may be otherwise configured to perform or support such operations.

Figure 8:
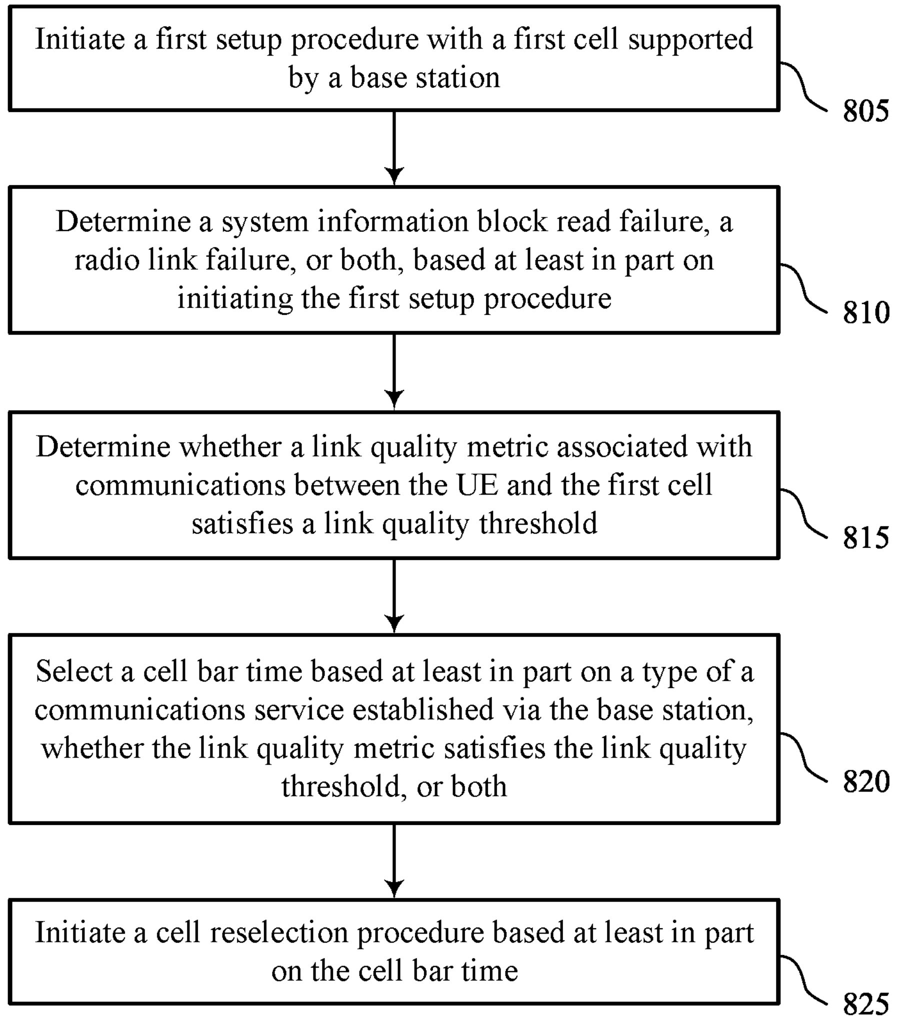
FIGS. 8 through 10 show flowcharts illustrating methods that support techniques for cell bar time selection in accordance with aspects of the present disclosure.

FIG. 8 shows a flowchart illustrating a method 800 for techniques for cell bar time selection in accordance with aspects of the present disclosure. The operations of method 800 may be implemented by a UE or its components as described herein. For example, the operations of method 800 may be performed by a UE 115 as described with reference to FIGS. 1 through 7. In some examples, a UE may execute a set of instructions to control the functional elements of the device to perform the described functions. Additionally or alternatively, the UE may perform aspects of the described functions using special-purpose hardware.

At 805, the method may include initiating a first setup procedure with a first cell supported by a base station. The operations of 805 may be performed according to the methods described herein. In some examples, aspects of the operations of 805 may be performed by a setup procedure manager 625 as described with reference to FIG. 6.

At 810, the method may include determining a SIB read failure, an RLF, or both, based at least in part on initiating the first setup procedure. The operations of 810 may be performed according to the methods described herein. In some examples, aspects of the operations of 810 may be performed by an RLF manager 630 as described with reference to FIG. 6.

At 815, the method may include determining whether a link quality metric associated with communications between the UE and the first cell satisfies a link quality threshold. The operations of 815 may be performed according to the methods described herein. In some examples, aspects of the operations of 815 may be performed by a link quality manager 640 as described with reference to FIG. 6.

At 820, the method may include selecting a cell bar time based at least in part on a type of a communications service established via the base station, whether the link quality metric satisfies the link quality threshold, or both. The operations of 820 may be performed according to the methods described herein. In some examples, aspects of the operations of 820 may be performed by a cell bar time manager 645 as described with reference to FIG. 6.

At 825, the method may include initiating a cell reselection procedure based at least in part on the cell bar time. The operations of 825 may be performed according to the methods described herein. In some examples, aspects of the operations of 825 may be performed by a reselection procedure manager 650 as described with reference to FIG. 6.

Figure 9:
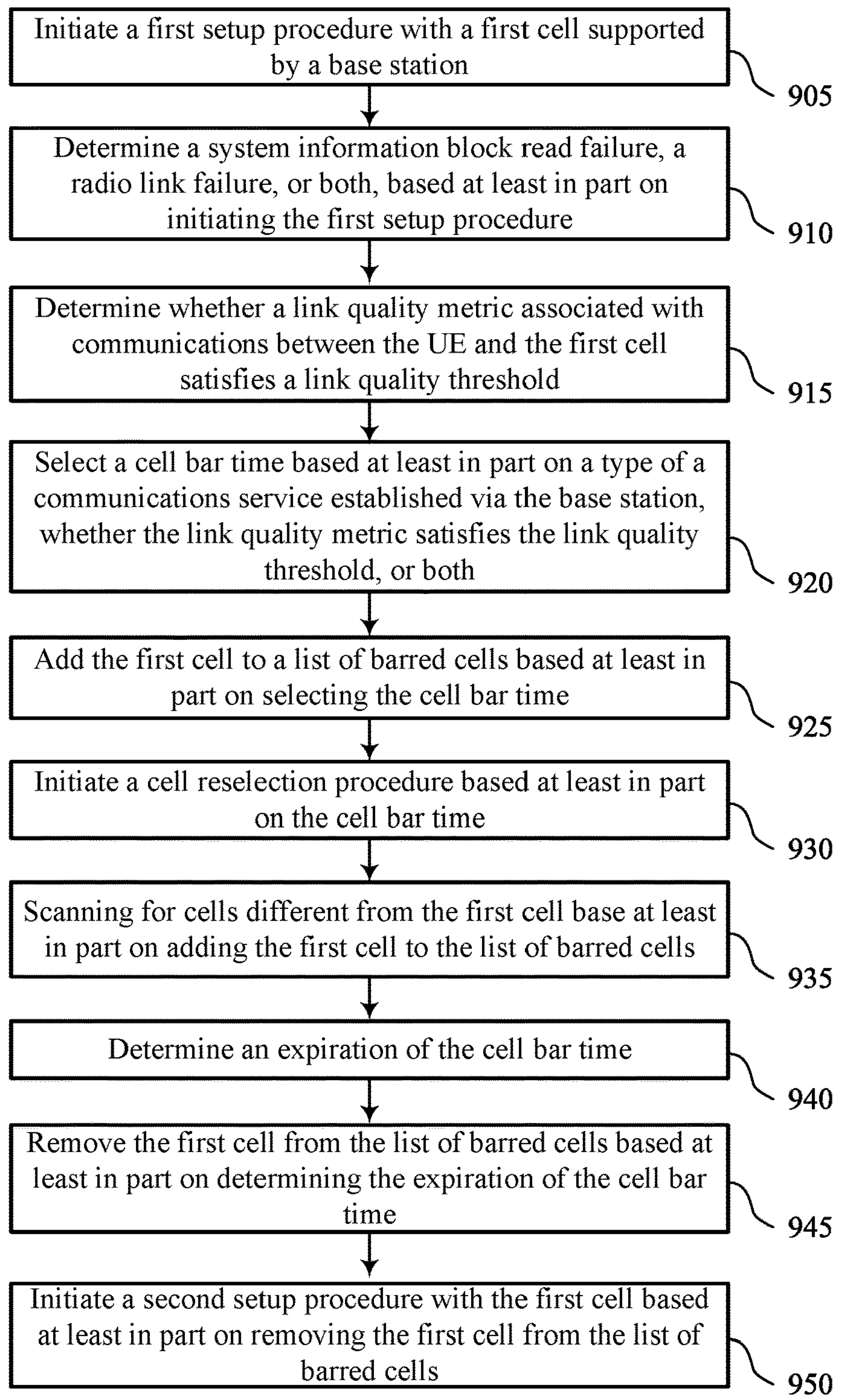

FIG. 9 shows a flowchart illustrating a method 900 for techniques for cell bar time selection in accordance with aspects of the present disclosure. The operations of method 900 may be implemented by a UE or its components as described herein. For example, the operations of method 900 may be performed by a UE 115 as described with reference to FIGS. 1 through 7. In some examples, a UE may execute a set of instructions to control the functional elements of the device to perform the described functions. Additionally or alternatively, the UE may perform aspects of the described functions using special-purpose hardware.

At 905, the method may include initiating a first setup procedure with a first cell supported by a base station. The operations of 905 may be performed according to the methods described herein. In some examples, aspects of the operations of 905 may be performed by a setup procedure manager 625 as described with reference to FIG. 6.

At 910, the method may include determining a SIB read failure, an RLF, or both, based at least in part on initiating the first setup procedure. The operations of 910 may be performed according to the methods described herein. In some examples, aspects of the operations of 910 may be performed by an RLF manager 630 as described with reference to FIG. 6.

At 915, the method may include determining whether a link quality metric associated with communications between the UE and the first cell satisfies a link quality threshold. The operations of 915 may be performed according to the methods described herein. In some examples, aspects of the operations of 915 may be performed by a link quality manager 640 as described with reference to FIG. 6.

At 920, the method may include selecting a cell bar time based at least in part on a type of a communications service established via the base station, whether the link quality metric satisfies the link quality threshold, or both. The operations of 920 may be performed according to the methods described herein. In some examples, aspects of the operations of 920 may be performed by a cell bar time manager 645 as described with reference to FIG. 6.

At 925, the method may include adding the first cell to a list of barred cells based at least in part on selecting the cell bar time. The operations of 925 may be performed according to the methods described herein. In some examples, aspects of the operations of 925 may be performed by a cell bar time manager 645 as described with reference to FIG. 6.

At 930, the method may include initiating a cell reselection procedure based at least in part on the cell bar time. The operations of 930 may be performed according to the methods described herein. In some examples, aspects of the operations of 930 may be performed by a reselection procedure manager 650 as described with reference to FIG. 6.

At 935, the method may include scanning for cells different from the first cell based at least in part on adding the first cell to the list of barred cells. The operations of 935 may be performed according to the methods described herein. In some examples, aspects of the operations of 935 may be performed by a reselection procedure manager 650 as described with reference to FIG. 6.

At 940, the method may include determining an expiration of the cell bar time. The operations of 940 may be performed according to the methods described herein. In some examples, aspects of the operations of 940 may be performed by a cell bar time manager 645 as described with reference to FIG. 6.

At 945, the method may include removing the first cell from the list of barred cells based at least in part on determining the expiration of the cell bar time. The operations of 945 may be performed according to the methods described herein. In some examples, aspects of the operations of 945 may be performed by a cell bar time manager 645 as described with reference to FIG. 6.

At 950, the method may include initiating a second setup procedure with the first cell based at least in part on removing the first cell from the list of barred cells. The operations of 950 may be performed according to the methods described herein. In some examples, aspects of the operations of 950 may be performed by a setup procedure manager 625 as described with reference to FIG. 6.

Figure 10:
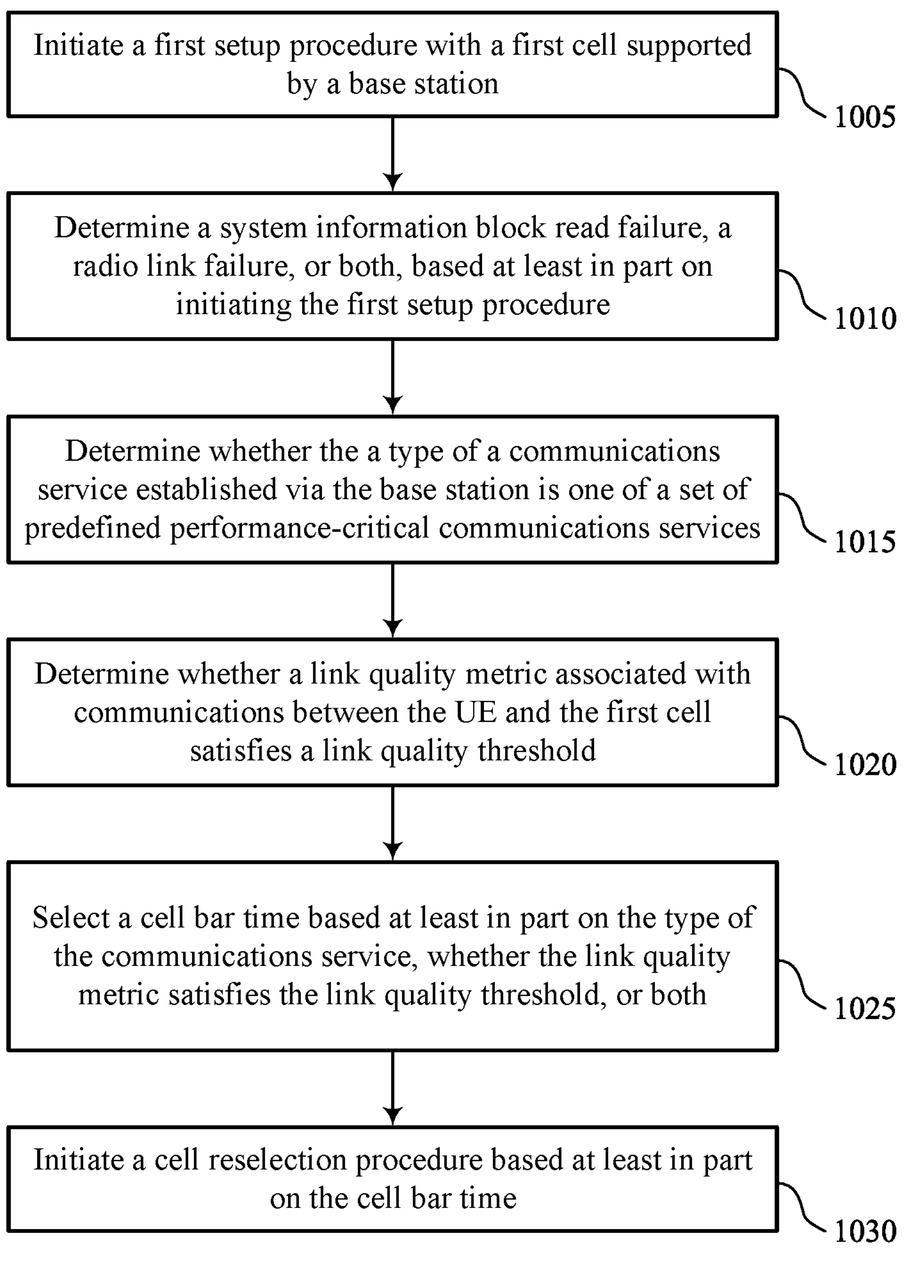

FIG. 10 shows a flowchart illustrating a method 1000 for techniques for cell bar time selection in accordance with aspects of the present disclosure. The operations of method 1000 may be implemented by a UE or its components as described herein. For example, the operations of method 1000 may be performed by a UE 115 as described with reference to FIGS. 1 through 7. In some examples, a UE may execute a set of instructions to control the functional elements of the device to perform the described functions. Additionally or alternatively, the UE may perform aspects of the described functions using special-purpose hardware.

At 1005, the method may include initiating a first setup procedure with a first cell supported by a base station. The operations of 1005 may be performed according to the methods described herein. In some examples, aspects of the operations of 1005 may be performed by a setup procedure manager 625 as described with reference to FIG. 6.

At 1010, the method may include determining a SIB read failure, an RLF, or both, based at least in part on initiating the first setup procedure. The operations of 1010 may be performed according to the methods described herein. In some examples, aspects of the operations of 1010 may be performed by an RLF manager 630 as described with reference to FIG. 6.

At 1015, the method may include determining whether a type of a communications service established via the base station is one of a set of predefined performance-critical communications services. The operations of 1015 may be performed according to the methods described herein. In some examples, aspects of the operations of 1015 may be performed by a communications service manager 635 as described with reference to FIG. 6.

At 1020, the method may include determining whether a link quality metric associated with communications between the UE and the first cell satisfies a link quality threshold. The operations of 1020 may be performed according to the methods described herein. In some examples, aspects of the operations of 1020 may be performed by a link quality manager 640 as described with reference to FIG. 6.

At 1025, the method may include selecting a cell bar time based at least in part on the type of the communications service, whether the link quality metric satisfies the link quality threshold, or both. The operations of 1025 may be performed according to the methods described herein. In some examples, aspects of the operations of 1025 may be performed by a cell bar time manager 645 as described with reference to FIG. 6.

At 1030, the method may include initiating a cell reselection procedure based at least in part on the cell bar time. The operations of 1030 may be performed according to the methods described herein. In some examples, aspects of the operations of 1030 may be performed by a reselection procedure manager 650 as described with reference to FIG. 6.

The following provides an overview of aspects of the present disclosure:

Aspect 1: A method for wireless communication at a UE, including: initiating a first setup procedure with a first cell supported by a base station; determining a SIB read failure, an RLF, or both, based at least in part on initiating the first setup procedure; determining whether a link quality metric associated with communications between the UE and the first cell satisfies a link quality threshold; selecting a cell bar time based at least in part on the a type of a communications service established via the base station, whether the link quality metric satisfies the link quality threshold, or both; and initiating a cell reselection procedure based at least in part on the cell bar time.

Aspect 2: The method of aspect 1, where initiating the cell reselection procedure based at least in part on the cell bar time includes: adding the first cell to a list of barred cells based at least in part on selecting the cell bar time; and scanning for cells different from the first cell based at least in part on adding the first cell to the list of barred cells.

Aspect 3: The method of aspect 2, further including: determining an expiration of the cell bar time; removing the first cell from the list of barred cells based at least in part on determining the expiration of the cell bar time; and initiating a second setup procedure with the first cell based at least in part on removing the first cell from the list of barred cells.

Aspect 4: The method of any of aspects 1 through 3, further including: determining whether the type of the communications service is one of a set of predefined performance-critical communications services.

Aspect 5: The method of aspect 4, where selecting the cell bar time is based at least in part on determining that the type of the communications service is one of the set of predefined performance-critical communications services.

Aspect 6: The method of aspect 5, where the predefined set of communications services includes a VoLTE call, a VoNR call, a gaming communications service, or any combination thereof.

Aspect 7: The method of any of aspects 5 through 6, where the type of the communications service is not one of the set of predefined performance-critical communications services, the method further including: selecting a second cell bar time different from the cell bar time if the link quality metric fails to satisfy the link quality threshold; and selecting the cell bar time if the link quality metric satisfies the link quality threshold.

Aspect 8: The method of aspect 7, where the cell bar time is shorter than the second cell bar time.

Aspect 9: The method of any of aspects 1 through 8, further including: determining a set of cell bar times; determining that the link quality metric satisfies the link quality threshold; determining that the link quality metric fails to satisfy a second link quality threshold different from the link quality threshold; and selecting the cell bar time from the set of cell bar times based at least in part on determining the link quality metric satisfies the link quality threshold and fails to satisfy the second link quality threshold.

Aspect 10: The method of any of aspects 1 through 9, further including: determining an RSRP metric associated with the first cell, an RSRQ metric associated with the first cell, an SNR metric associated with the first cell, an SINK metric associated with the first cell, or any combination thereof, where the link quality metric includes the RSRP metric, the RSRQ metric, the SNR metric, the SINR metric, or any combination thereof.

Aspect 11: The method of any of aspects 1 through 10, further including: determining a type of bearer associated with the communications service, a latency metric associated with the communications service, a QoS metric associated with the communications service, a reliability metric associated with the communications service, or any combination thereof, where determining the type of the communications service is based at least in part on the determined type of bearer, the determined latency metric, the determined QoS metric, the determined reliability metric, or any combination thereof.

Aspect 12: The method of any of aspects 1 through 11, further including: receiving, from a higher layer of the UE, an indication of the type of the communications service, where determining the type of the communications service is based at least in part on receiving the indication from the higher layer of the UE.

Aspect 13: The method of any of aspects 1 through 12, further including: establishing the communications service in a connected mode of operation prior to initiating the first setup procedure, where determining the SIB read failure, the RLF, or both, is based at least in part on establishing the communications service in the connected mode of operation.

Aspect 14: An apparatus for wireless communication at a UE, including a processor; memory coupled with the processor; and instructions stored in the memory and executable by the processor to cause the apparatus to perform a method of any of aspects 1 through 13.

Aspect 15: An apparatus for wireless communication at a UE, including at least one means for performing a method of any of aspects 1 through 13.

Aspect 16: A non-transitory computer-readable medium storing code for wireless communication at a UE, the code including instructions executable by a processor to perform a method of any of aspects 1 through 13.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Additionally, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
- initiating a first setup procedure with a first cell supported by a network device;
- determining, for the first cell, a system information block read failure, a radio link failure, or both, based at least in part on initiating the first setup procedure;
- determining that a link quality metric associated with communications between the UE and the first cell satisfies a link quality threshold;
- determining a set of cell bar times;
- determining that the link quality metric fails to satisfy a second link quality threshold different from the link quality threshold;
- selecting a cell bar time from the set of cell bar times based at least in part on the determining that the link quality metric satisfies the link quality threshold and fails to satisfy the second link quality threshold, the cell bar time corresponding to a duration which the UE is barred from attempting to connect to the first cell; and
- initiating a cell reselection procedure based at least in part on the cell bar time.

2. The method of claim 1, wherein initiating the cell reselection procedure based at least in part on the cell bar time comprises:
- adding the first cell to a list of barred cells based at least in part on selecting the cell bar time; and scanning for cells different from the first cell based at least in part on adding the first cell to the list of barred cells.

3. The method of claim 2, further comprising:

determining an expiration of the cell bar time;

removing the first cell from the list of barred cells based at least in part on determining the expiration of the cell bar time; and initiating a second setup procedure with the first cell based at least in part on removing the first cell from the list of barred cells.

4. The method of claim 1, wherein the selecting the cell bar time is based at least in part on a type of a communications service established via the network device, the method further comprising:

determining whether the type of the communications service is one of a set of predefined performance-critical communications services.

5. The method of claim 4, wherein selecting the cell bar time is based at least in part on determining that the type of the communications service is one of the set of predefined performance-critical communications services.

6. The method of claim 5, wherein the set of predefined performance-critical communications services comprises a voice over Long Term Evolution (VoLTE) call, a voice over New Radio (VoNR) call, a gaming communications service, or any combination thereof.

7. The method of claim 5, wherein the type of the communications service is not one of the set of predefined performance-critical communications services, the method further comprising:

selecting a second cell bar time different from the cell bar time if the link quality metric fails to satisfy the link quality threshold; and selecting the cell bar time if the link quality metric satisfies the link quality threshold.

8. The method of claim 7, wherein the cell bar time is shorter than the second cell bar time.

9. The method of claim 1, further comprising:

determining a reference signal received power (RSRP) metric associated with the first cell, a reference signal received quality (RSRQ) metric associated with the first cell, a signal-to-noise ratio (SNR) metric associated with the first cell, a signal-to-interference-plus-noise ratio (SINR) metric associated with the first cell, or any combination thereof, wherein the link quality metric comprises the RSRP metric, the RSRQ metric, the SNR metric, the SINR metric, or any combination thereof.

10. The method of claim 1, wherein the selecting the cell bar time is based at least in part on a type of a communications service established via the network device, the method further comprising:

determining a type of bearer associated with the communications service, a latency metric associated with the communications service, a quality of service metric associated with the communications service, a reliability metric associated with the communications service, or any combination thereof, wherein determining the type of the communications service is based at least in part on the determined type of bearer, the determined latency metric, the determined quality of service metric, the determined reliability metric, or any combination thereof.

11. The method of claim 1, wherein the selecting the cell bar time is based at least in part on a type of a communications service established via the network device, the method further comprising:

receiving, from a higher layer of the UE, an indication of the type of the communications service, wherein determining the type of the communications service is based at least in part on receiving the indication from the higher layer of the UE.

12. The method of claim 1, further comprising:

establishing a communications service in a connected mode of operation prior to initiating the first setup procedure, wherein determining the system information block read failure, the radio link failure, or both, is based at least in part on establishing the communications service in the connected mode of operation.

13. An apparatus for wireless communication at a user equipment (UE), comprising:

a processor, memory coupled with the processor; and instructions stored in the memory and executable by the processor to cause the apparatus to:

initiate a first setup procedure with a first cell supported by a network device;

determine, for the first cell, a system information block read failure, a radio link failure, or both, based at least in part on initiating the first setup procedure;

determine that a link quality metric associated with communications between the UE and the first cell satisfies a link quality threshold;

determine a set of cell bar times;

determine that the link quality metric fails to satisfy a second link quality threshold different from the link quality threshold;

select a cell bar time from the set of cell bar times based at least in part on a determination that the link quality metric satisfies the link quality threshold and fails to satisfy the second link quality threshold, the cell bar time corresponding to a duration which the UE is barred from attempting to connect to the first cell; and initiate a cell reselection procedure based at least in part on the cell bar time.

14. The apparatus of claim 13, wherein the instructions to initiate the cell reselection procedure based at least in part on the cell bar time are executable by the processor to cause the apparatus to:

add the first cell to a list of barred cells based at least in part on selecting the cell bar time; and scanning for cells different from the first cell based at least in part on adding the first cell to the list of barred cells.

15. The apparatus of claim 14, wherein the instructions are further executable by the processor to cause the apparatus to:

determine an expiration of the cell bar time;

remove the first cell from the list of barred cells based at least in part on determining the expiration of the cell bar time; and initiate a second setup procedure with the first cell based at least in part on removing the first cell from the list of barred cells.

16. The apparatus of claim 13, wherein selection of the cell bar time is based at least in part on a type of a communications service established via the network device, and wherein the instructions are further executable by the processor to cause the apparatus to:

determine whether the type of the communications service is one of a set of predefined performance-critical communications services.

17. The apparatus of claim 16, wherein selecting the cell bar time is based at least in part on determining that the type of the communications service is one of the set of predefined performance-critical communications services.

18. The apparatus of claim 17, wherein the set of predefined performance-critical communications services comprises a voice over Long Term Evolution (VoLTE) call, a voice over New Radio (VoNR) call, a gaming communications service, or any combination thereof.

19. The apparatus of claim 17, wherein the type of the communications service is not one of the set of predefined performance-critical communications services, and the instructions are further executable by the processor to cause the apparatus to:

select a second cell bar time different from the cell bar time if the link quality metric fails to satisfy the link quality threshold; and select the cell bar time if the link quality metric satisfies the link quality threshold.

20. The apparatus of claim 19, wherein the cell bar time is shorter than the second cell bar time.

21. The apparatus of claim 13, wherein the instructions are further executable by the processor to cause the apparatus to:

determine a reference signal received power (RSRP) metric associated with the first cell, a reference signal received quality (RSRQ) metric associated with the first cell, a signal-to-noise ratio (SNR) metric associated with the first cell, a signal-to-interference-plus-noise ratio (SINR) metric associated with the first cell, or any combination thereof, wherein the link quality metric comprises the RSRP metric, the RSRQ metric, the SNR metric, the SINR metric, or any combination thereof.

22. The apparatus of claim 13, wherein selection of the cell bar time is based at least in part on a type of a communications service established via the network device, and wherein the instructions are further executable by the processor to cause the apparatus to:

determine a type of bearer associated with the communications service, a latency metric associated with the communications service, a quality of service metric associated with the communications service, a reliability metric associated with the communications service, or any combination thereof, wherein determining the type of the communications service is based at least in part on the determined type of bearer, the determined latency metric, the determined quality of service metric, the determined reliability metric, or any combination thereof.

23. The apparatus of claim 13, wherein selection of the cell bar time is based at least in part on a type of a communications service established via the network device, and wherein the instructions are further executable by the processor to cause the apparatus to:

receive, from a higher layer of the UE, an indication of the type of the communications service, wherein determining the type of the communications service is based at least in part on receiving the indication from the higher layer of the UE.

24. The apparatus of claim 13, wherein the instructions are further executable by the processor to cause the apparatus to:

establish a communications service in a connected mode of operation prior to initiating the first setup procedure, wherein determining the system information block read failure, the radio link failure, or both, is based at least in part on establishing the communications service in the connected mode of operation.

25. An apparatus for wireless communication at a user equipment (UE), comprising:

means for initiating a first setup procedure with a first cell supported by a network device;

means for determining, for the first cell, a system information block read failure, a radio link failure, or both, based at least in part on initiating the first setup procedure;

means for determining that a link quality metric associated with communications between the UE and the first cell satisfies a link quality threshold;

means for determining a set of cell bar times;

means for determining that the link quality metric fails to satisfy a second link quality threshold different from the link quality threshold;

means for selecting a cell bar time from the set of cell bar times based at least in part on a determination that the link quality metric satisfies the link quality threshold and fails to satisfy the second link quality threshold, the cell bar time corresponding to a duration which the UE is barred from attempting to connect to the first cell; and means for initiating a cell reselection procedure based at least in part on the cell bar time.

26. A non-transitory computer-readable medium storing code for wireless communication at a user equipment (UE), the code comprising instructions executable by a processor to:

initiate a first setup procedure with a first cell supported by a network device;

determine, for the first cell, a system information block read failure, a radio link failure, or both, based at least in part on initiating the first setup procedure;

determine that a link quality metric associated with communications between the UE and the first cell satisfies a link quality threshold;

determine a set of cell bar times;

determine that the link quality metric fails to satisfy a second link quality threshold different from the link quality threshold;

select a cell bar time from the set of cell bar times based at least in part on a determination that the link quality metric satisfies the link quality threshold and fails to satisfy the second link quality threshold, the cell bar time corresponding to a duration which the UE is barred from attempting to connect to the first cell; and initiate a cell reselection procedure based at least in part on the cell bar time.

27. The non-transitory computer-readable medium of claim 26, wherein the instructions to initiate the cell reselection procedure based at least in part on the cell bar time are executable by the processor to:

add the first cell to a list of barred cells based at least in part on selecting the cell bar time; and scan for cells different from the first cell based at least in part on adding the first cell to the list of barred cells.

28. The non-transitory computer-readable medium of claim 27, wherein the instructions are further executable by the processor to:

determine an expiration of the cell bar time;

remove the first cell from the list of barred cells based at least in part on determining the expiration of the cell bar time; and initiate a second setup procedure with the first cell based at least in part on removing the first cell from the list of barred cells.

* * * * *